(12) United States Patent
Shiraishi et al.

(10) Patent No.: US 7,544,230 B2
(45) Date of Patent: *Jun. 9, 2009

(54) METHOD OF MANUFACTURING MAGNETIC PARTICLE, MAGNETIC PARTICLE AND MAGNETIC RECORDING MEDIUM

(75) Inventors: Fumiko Shiraishi, Minami-Ashigara (JP); Yasunori Ichikawa, Minami-Ashigara (JP); Koukichi Waki, Minami-Ashigara (JP); Yasushi Hattori, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 628 days.

This patent is subject to a terminal disclaimer.

(21) Appl. No.: 10/792,297

(22) Filed: Mar. 4, 2004

(65) Prior Publication Data

US 2004/0231463 A1     Nov. 25, 2004

(30) Foreign Application Priority Data

| Mar. 5, 2003 | (JP) | ............................. 2003-059044 |
| Mar. 7, 2003 | (JP) | ............................. 2003-062084 |
| Feb. 10, 2004 | (JP) | ............................. 2004-033405 |

(51) Int. Cl.
*B22F 9/24* (2006.01)
(52) U.S. Cl. .......................................... 75/348; 75/371
(58) Field of Classification Search ............ None
See application file for complete search history.

(56) References Cited

U.S. PATENT DOCUMENTS

| 3,672,867 | A |   | 6/1972  | Little, Jr. |
| 4,141,763 | A |   | 2/1979  | Aonuma et al. |
| 4,330,300 | A | * | 5/1982  | Cairns ........................ 44/282 |
| 6,159,442 | A | * | 12/2000 | Thumm et al. .............. 423/659 |
| 6,221,332 | B1 | * | 4/2001  | Thumm et al. .............. 423/659 |
| 6,254,662 | B1 | * | 7/2001  | Murray et al. ................ 75/348 |
| 6,827,968 | B2 | * | 12/2004 | Naoe .......................... 427/122 |
| 6,994,895 | B2 | * | 2/2006  | Hattori et al. ............... 427/599 |
| 7,066,978 | B2 | * | 6/2006  | Waki et al. .................... 75/348 |
| 2001/0009119 | A1 | * | 7/2001 | Murray et al. ................ 75/348 |
| 2002/0068187 | A1 |   | 6/2002 | O'Connor et al. |
| 2003/0165759 | A1 | * | 9/2003 | Suzuki et al. ............. 430/108.4 |
| 2003/0219669 | A1 | * | 11/2003 | Yamashita et al. ....... 430/109.4 |
| 2004/0033357 | A1 | * | 2/2004 | Hattori et al. ............... 428/379 |

(Continued)

FOREIGN PATENT DOCUMENTS

DE         3621624 A1     1/1988

(Continued)

OTHER PUBLICATIONS

Communication from Japanese Patent Office dated May 23, 2008.

*Primary Examiner*—John P. Sheehan
(74) *Attorney, Agent, or Firm*—Sughrue Mion, PLLC

(57) ABSTRACT

The solution I is spouted from a first nozzle into a mixing chamber as a high-pressure jet stream of not less than 1 MPa and as a turbulent flow having a Reynolds number of not less than 10000 during the flow into the mixing chamber, and the solution II having a lower pressure than the solution I is spouted from a second nozzle into the mixing chamber as an orthogonal flow which intersects the solution I almost at right angles. The two solutions are mixed together and caused to react with each other, with the result that a mixed reaction solution Z containing alloy particles Z is formed.

14 Claims, 13 Drawing Sheets

U.S. PATENT DOCUMENTS

2004/0223847 A1* 11/2004 Cvjeticanin et al. ......... 415/206
2005/0106487 A1*  5/2005 Harada et al. ............ 430/108.1
2005/0223847 A1* 10/2005 Shiraishi et al. ............... 75/348

FOREIGN PATENT DOCUMENTS

| | | |
|---|---|---|
| EP | 1 109 159 A1 | 6/2001 |
| JP | 05-173267 A | 7/1993 |
| JP | 6-287005 A | 10/1994 |
| JP | 8-196896 A | 8/1996 |
| JP | 2000-155981 A | 6/2000 |
| JP | 2001-256631 A | 9/2001 |
| JP | 2002-162501 A | 6/2002 |
| JP | 2003-006830 A | 1/2003 |
| JP | 2003-297617 A | 10/2003 |
| WO | WO 02/062509 A1 | 8/2002 |

* cited by examiner

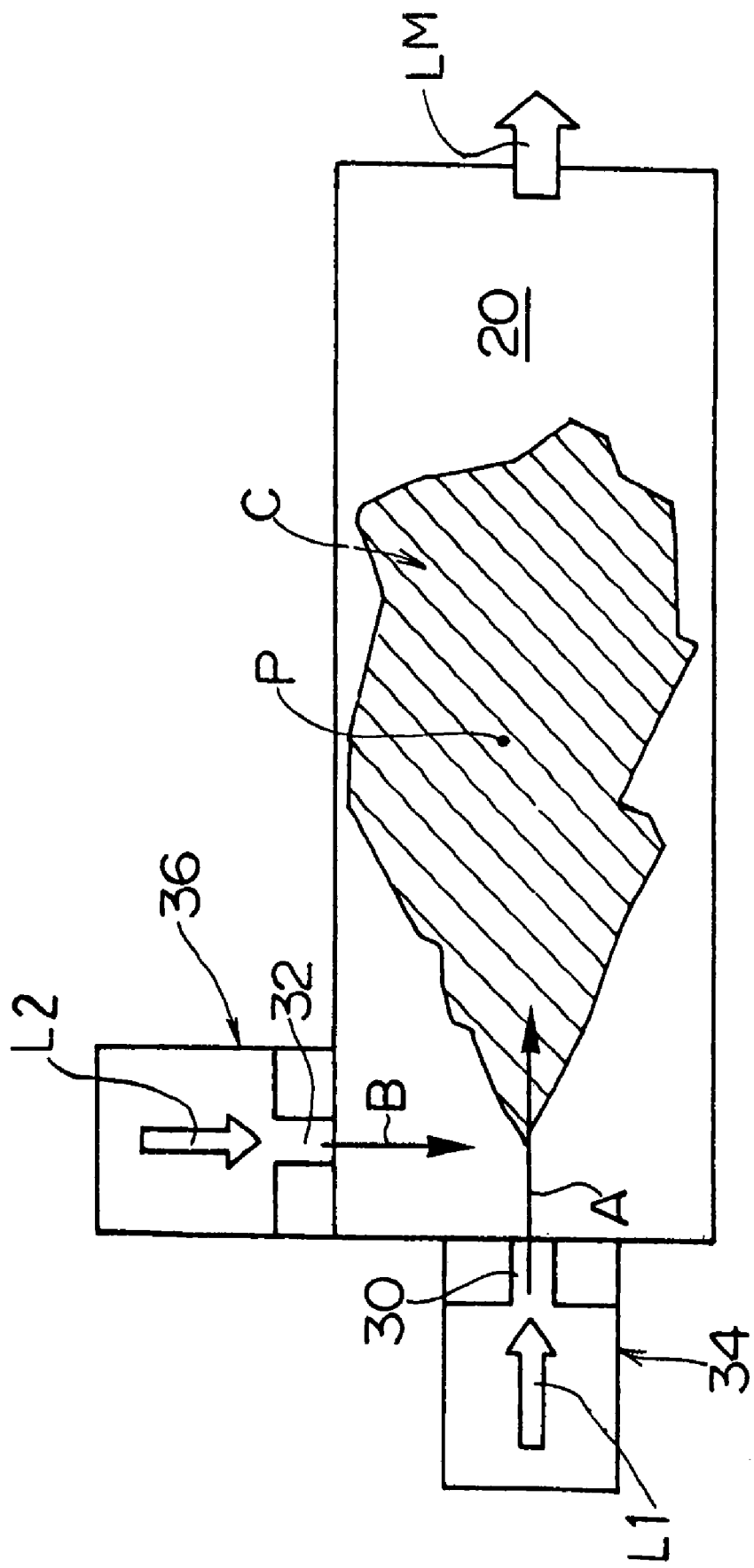

METHOD OF MANUFACTURING MAGNETIC PARTICLE, MAGNETIC PARTICLE AND MAGNETIC RECORDING MEDIUM

BACKGROUND OF THE INVENTION

1. Field of the Invention

The present invention relates to a method of manufacturing a magnetic particle, a magnetic particle and a magnetic recording medium containing this magnetic particle in a magnetic layer.

2. Description of the Related Art

Reducing the particle size of a magnetic particle contained in a magnetic layer is important for increasing the magnetic recording density. For example, in magnetic recording media widely used as video tapes, computer tapes, disks, etc., noise decreases when the particle size is reduced in a case where the mass of a hard magnetic material is the same.

A CuAu type or $Cu_3Au$ type hard magnetic ordered alloy is attracting attention as a material for a magnetic particle which is promising for improving the magnetic recording density (described, for example, in Japanese Patent Application Publication No. 2003-6830 and Japanese Patent Application Publication No. 2001-256631). Because this hard magnetic ordered alloy has large crystal magnetic anisotropy because of strains generated during ordering and it is known that this alloy shows hard magnetism even when the particle size of a magnetic particle is reduced.

Although a magnetic particle showing hard magnetism is prepared by a liquid phase process, a gaseous phase process, etc., a magnetic particle immediately after the preparation of a practical liquid phase process excellent in mass producibility, in particular, has a structure of an unordered face-centered cubic crystal. A face-centered cubic crystal usually shows soft magnetism or paramagnetism and is unsuitable for a magnetic recording medium. In a magnetic recording medium, therefore, it is necessary to obtain a hard magnetic ordered alloy having a coercive force of not less than 95.5 kA/m (1200 Oe). In order to obtain such a hard magnetic ordered alloy, it is necessary to cause an unordered phase to transform to an ordered phase. For this reason, the manufacturing of a magnetic particle comprises the alloy particle preparation step of preparing an alloy particle capable of forming a CuAu type or $Cu_3Au$ type hard magnetic ordered alloy phase and the magnetic particle formation step of forming a CuAu type or $Cu_3Au$ type magnetic particle from the alloy particle formed in this preparation step, and in the magnetic particle formation step, usually annealing treatment (heat treatment) is performed.

However, whether the performance of a magnetic particle used in a magnetic recording medium is good is not determined by the magnetic particle formation step alone, and the key point is how to prepare, in the alloy particle preparation step, an alloy particle which has a micro size, is excellent in monodispersibility and provides an excellent transformation facilitativeness which facilitates the transformation of an unordered phase to an ordered phase. Usually, the preparation of an alloy particle is performed by mixing a plurality of kinds of solutions for alloy particle preparation by the above-described liquid phase process, and a device in which a stirring vane is provided in a tank as shown in FIG. 13 has been proposed as a mixing and reaction device (Japanese Patent Application Publication No. 5-173267).

In this mixing and reaction device 1, in order to stir solutions filled in the interior of a tank 2, a stirring vane 5 is rotated and driven via transmission device 4 which transmits the rotational driving force of a motor 3 in a noncontact manner by use of magnetic force. On the outer circumferential surface of the tank 1 is provided temperature control device 6, which heats or cools the solutions in order to control the temperature control of the solutions filled in the interior. A sealing lid 7 of this tank 2 is provided with an introduction pipe 8 which introduces the solutions and the bottom of the tank 2 is provided with a discharge pipe 9 which discharges mixed reaction solutions which are mixed and caused to react within the tank 2.

However, in the preparation of an alloy particle by use of the conventional mixing and reaction device, a dead space is present within the tank 2, making the stirring of the solution nonuniform, and particle growth occurs due to the partial circulation of a formed alloy particle within the tank 2. Therefore, the conventional preparation of an alloy particle has the drawback that it is impossible to produce an alloy particle which has a micro size, is excellent in monodispersibility and provides an excellent transformation facilitativeness.

Furthermore, magnetic recording media which have recently been widely used as video tapes, computer tapes, disks, etc., are required to meet the requirement for a further noise reduction.

SUMMARY OF THE INVENTION

The present invention was made in view of such a situation and has as its object the provision of a method of manufacturing a magnetic particle, which is capable of manufacturing a magnetic particle having good performance for achieving a sufficiently low noise level of a magnetic recording medium because an alloy particle which has a micro size, is excellent in monodispersibility and provides an excellent transformation facilitativeness can be prepared in the alloy particle preparation step, a magnetic particle and a magnetic recording medium containing this magnetic particle in a magnetic layer.

The inventors of the present invention has obtained the knowledge that an alloy particle which has a micro size, is excellent in monodispersibility and provides an excellent self-assembling property can be obtained by mixing a plurality of kinds of solutions for preparing an alloy particle capable of forming a CuAu type or $Cu_3Au$ type hard magnetic ordered alloy phase and causing the solutions to react in a mixing field by a liquid phase process and by mixing at least one of the plurality of kinds of solutions by a high-pressure mixing method which involves spouting the solution to the mixing field by a high-pressure jet stream of not less than 1 MPa.

First, the lowering of the noise level of a magnetic recording medium will be described in order to facilitate the understanding of the present invention.

The sputtering method which is known as a method of preparing a magnetic recording medium for a hard disk forms a magnetic film in a polycrystal state. A monocrystal which forms the magnetic film in question has a particle size of about 20 nm and is in the shape of a cylinder which has a height of about 100 nm. The coefficient of variation in the particle size (particle diameter) of a monocrystal is as large as not less than 20%. In the sputtering method, monocrystals which form the magnetic film in question adjoin each other and, therefore, the monocrystal in question, along with the adjoining monocrystals, is magnetized. For this reason, an actual magnetization unit becomes larger than that of the monocrystal in question. From this, although attempts have been made to make the magnetization unit small by causing the segregation of chromium etc. in a crystal grain field, these attempts have been insufficient as measures to lower the magnetization unit. However, in order to lower the noise level of a recording medium, it is necessary to reduce the particle diameter and lower the coefficient of variation for further lowering the magnetization unit.

In a general manufacturing method of a magnetic recording medium for magnetic tapes and flexible disks, magnetic particles formed from iron, an alloy of iron and cobalt, iron oxide or barium ferrite are first subjected to annealing treatment, kneaded with a binder and then applied after dispersion. In this method, however, annealing treatment is performed in the state of the magnetic particle and hence the particles tend to fuse or coalesce. Therefore, the coefficient of variation in the particle size is about 20% at the best and a sufficiently low level noise is not achieved. Furthermore, the magnetic anisotropy constant of these magnetic materials is small. Therefore, when the size is not more than 20 nm, a superparamagnetic state occurs under the influence of thermal fluctuations and these magnetic materials cannot be used as a magnetic recording medium.

Thus, whether a magnetic recording medium for hard disk or a magnetic recording medium for magnetic tape or flexible disk, it is important to lower the coefficient of variation in the particle size to not more than 20% for lowering the noise level sufficiently.

The present inventors paid attention to the following knowledge as measures to lower this coefficient of variation to not more than 20%:

(1) Unlike the sputtering method, in the reversed micelle process, it is possible to prepare within a micelle a magnetic particle having a size of not more than 20 nm in a condition separated from other magnetic particles.

(2) If an alloy particle capable of forming a CuAu type or $Cu_3Au$ type hard magnetic ordered alloy phase is used as a precursor for manufacturing a magnetic particle, even in a case where the size is not more than 20 nm, the magnetic material shows hard magnetism suitable for a magnetic recording medium and, at the same time, the particle size of an alloy particle to be prepared is within the range of 1 to 100 nm and the coefficient of variation in the particle size of the alloy particle is not more than 15%. This is advantageous.

(3) Even when an alloy particle capable of forming a CuAu type or $Cu_3Au$ type hard magnetic ordered alloy phase is manufactured by using the reversed micelle process, in the case of use of a mixing and reaction device in which a stirring vane is provided within a tank, as described in the prior art, the coefficient of variation in the particle size does not become 20% or less and it is difficult to control the particle diameter even when an alloy particle having a particle size of not more than 20 nm may be prepared. However, an alloy particle which has a micro size, is excellent in monodispersibility and provides an excellent self-assembling property can be obtained by mixing a plurality of kinds of solutions for preparing an alloy particle capable of forming a CuAu type or $Cu_3Au$ type hard magnetic ordered alloy phase and causing the solutions to react in a mixing field by a liquid phase process and by mixing at least one of the plurality of kinds of solutions by a high-pressure mixing method which involves spouting the solution to the mixing field by a high-pressure jet stream of not less than 1 MPa, and it is easy to cause an alloy phase to undergo transformation for an unordered phase to an ordered phase in the magnetic particle formation step of forming an alloy particle to a CuAu type or $Cu_3Au$ type magnetic particle (for example, annealing treatment).

(4) By appropriately controlling the mixing and reaction temperature in the high-pressure mixing method, the size control of the alloy particle to be prepared can be performed with good accuracy.

(5) By performing annealing treatment, with alloy particles applied to a backing and fixed, it is possible to prevent particles from fusing or coalescing.

The particle size (particle diameter) in the present invention is indicated by the diameter of a circle having an area equal to the projected area of the parallel outer surfaces of a particle. That is, the projected area of a particle is obtained by measuring the area on an electron micrograph and correcting the projection magnification. By supposing a circle having an area equal to the projected area of a particle, the diameter of this circle is regarded as the circle-equivalent diameter of an alloy particle (or a magnetic particle in some cases). Furthermore, the coefficient of variation in the particle size device a value obtained by dividing the standard deviation of the circle-equivalent diameter in all particles by the average particle diameter.

On the basis of this knowledge, the present invention was concretely constituted as a method of manufacturing a magnetic particle, a magnetic particle and a magnetic recording medium.

In order to achieve the above object, in the first aspect of the present invention, there is provided a method of manufacturing a magnetic particle, which comprises: the alloy particle preparation step of preparing an alloy particle capable of forming a CuAu type or $Cu_3Au$ type hard magnetic ordered alloy phase and the magnetic particle formation step; wherein in the alloy preparation formation step, a plurality of kinds of solutions for preparing the alloy particle are mixed together and caused to react with each other in a mixing field by a liquid phase process and at least one of the plurality of kinds of solutions is mixed by a high-pressure mixing method which involves supplying the solution to the mixing field by a high-pressure jet stream of not less than 1 MPa.

According to the first aspect of the present invention, in the alloy particle preparation formation step, a plurality of kinds of solutions for preparing the alloy particle are mixed and caused to react in a mixing field by a liquid phase process and at least one of the plurality of kinds of solutions is mixed by a high-pressure mixing method which involves supplying the solution to the mixing field by a high-pressure jet stream of not less than 1 MPa. As a result of this, it is possible to instantaneously and efficiently mix, in a mixing field, a plurality of kinds of solutions together and cause these solutions to react and, therefore, it is possible to form an alloy particle which has a micro size and is excellent in monodispersibility. Therefore, it is possible ensure that the particle size of an alloy particle prepared by the mixing and reaction by this high-pressure mixing method is 1 to 100 nm and that the coefficient of variation in the particle size is not more than 15%. This is because an alloy particle having a particle size of less than 1 nm tends to show superparamagnetism and hence is unsuitable for an alloy particle for manufacturing a magnetic particle used in a magnetic recording medium and because a sufficiently low noise level cannot be achieved if the particle size exceeds 100 nm. The particle size of an alloy particle is more preferably in the range of 3 to 20 nm and especially preferably in the range is 3 to 10 nm.

Furthermore, this is because a sufficiently low noise level cannot achieved if the coefficient of variation in the particle size of an alloy particle exceeds 15%. A more preferable coefficient of variation is not more than 10%.

In addition, because an alloy particle prepared by this high-pressure mixing method is excellent in the self-assembling property, it is possible easily to cause the alloy particle to undergo transformation to a CuAu type or Cu₃Au type magnetic particle in the magnetic particle forming step.

The second aspect of the present invention is that in the first aspect, the particle size of the alloy particle prepared by the mixing and reaction is 1 to 100 nm and the coefficient of variation in the particle size is not more than 15%.

The second aspect of the present invention specifies the size and coefficient of variation of the alloy particle prepared by the mixing and reaction in the method of manufacturing a magnetic particle in the first aspect.

The third aspect of the present invention is that in the first aspect, the liquid phase process is the reversed micelle process and as the plurality of kinds of solutions, a reversed micelle solution (Solution L1), which is obtained by mixing a nonaqueous organic solvent containing a surfactant and an aqueous reductant solution, and a reversed micelle solution (Solution L2), which is obtained by mixing a nonaqueous organic solvent containing a surfactant and an aqueous metallic salt solution containing a plurality of kinds of metallic atoms constituting the alloy particle, are prepared and at least one of the Solution L1 and Solution L2 is formed as the high-pressure jet stream of not less than 1 MPa.

According to the third aspect of the present invention, by performing the liquid phase process by the reversed micelle process, it becomes easy to control the particle diameter of a prepared alloy particle. Furthermore, it is possible to prepare, as the plurality of kinds of solutions, Solution L1 which is constituted by a nonaqueous solvent containing a surfactant and an aqueous reductive solution and Solution L2 which is constituted by a nonaqueous organic solvent containing a surfactant and an aqueous metallic salt solution containing a plurality of kinds of metallic atoms constituting the alloy particle. That is, it is possible to cause all the plurality of kinds of metallic atoms constituting the alloy particle to be contained in the solution L2 which is mixed with the solution L1 and caused to react, and at least one of the solutions L1 and L2 is supplied as a high-pressure jet stream of not less than 1 MPa.

The fourth aspect of the present invention is that in the first aspect, the liquid phase process is the reversed micelle process and as the plurality of kinds of solutions, a reversed micelle solution (Solution L1), which is obtained by mixing a nonaqueous organic solvent containing a surfactant and an aqueous reductant solution, and a reversed micelle solution (Solution L3), which is obtained by mixing a nonaqueous organic solvent containing a surfactant and an aqueous metallic salt solution containing one of a plurality of kinds of metallic atoms constituting the alloy particle, are prepared, the number of prepared Solutions L3 being equal to the number of the plurality of kinds of metallic atoms, and at least one of Solution L1 and the plurality of Solutions L3 is supplied as the high-pressure jet stream of not less than 1 MPa.

In the fourth aspect of the present invention, a plurality of the solutions L3 are prepared, each of which contains one kind selected from the plurality of metallic atoms constituting the alloy particle, and at least one of Solution L1 and the plurality of Solutions L3 is supplied as the high-pressure jet stream of not less than 1 MPa.

The fifth aspect of the present invention is that in the first aspect, all of the plurality of kinds of solutions are caused to collide with each other in the mixing field as high-pressure jet streams of not less than 1 MPa.

In the fifth aspect of the present invention, all of the plurality of kinds of solutions are caused to collide with each other as high-pressure jet streams of not less than 1 MPa, and by use of the energy of collision it is possible to instantaneously and efficiently cause the plurality of kinds of solutions to mix and react with each other.

The sixth aspect of the present invention is that in the first aspect, the plurality of kinds of solutions are turbulent flows having a Reynolds number of not less than 10000 during the flow into the mixing field.

The sixth aspect of the present invention specifies a desirable Reynolds number when the plurality of kinds of solutions flow into the mixing field, and by supplying turbulent flows having a Reynolds number of not less than 10000, it is possible to instantaneously and efficiently cause the plurality of kinds of solutions to mix together and react with each other.

The seventh aspect of the present invention is that in the first aspect, the plurality of kinds of solutions are supplied from a concentric multiple-cylindrical pipe to a mixing field formed at a leading end of the multiple-cylindrical pipe and are mixed together and caused to react with each other and, at the same time, by use of a static mixing device which discharges a mixed reaction solution from the mixing field, the plurality of kinds of solutions are supplied as turbulent flows having a Reynolds number of not less than 10000 during the flow into the mixing field.

According to the seventh aspect of the present invention, the plurality of kinds of solutions are supplied from a multiple-cylindrical pipe to the mixing filed as parallel turbulent flows and, therefore, the plurality of kinds of solutions form turbulent flow interfaces in the direction of travel, with the result that it is possible to instantaneously and efficiently cause the plurality of kinds of solutions to mix together and react with each other.

The eighth aspect of the present invention is that in the first aspect, the plurality of kinds of solutions are spouted from the respective nozzles to the mixing filed having a diameter larger than a bore diameter of the nozzles and are mixed together and caused to react with each other and at the same time by use of a static mixing device which discharges a mixed reaction solution from the outlet having a diameter smaller than a diameter of the mixing field, at least one of the plurality of kinds of solutions is supplied to the mixing field as the high-pressure jet stream of not less than 1 MPa and as a turbulent flow having a Reynolds number of not less than 10000 during the flow into the mixing field, and the remaining solutions are added at a lower pressure than the high-pressure jet stream in a position where the eddy viscosity which the high-pressure jet stream forms with respect to the direction of flow does not yet obtain a maximum value.

As in the eighth aspect of the present invention, the plurality of kinds of solutions are spouted from the respective nozzles to the mixing field having a diameter larger than a bore diameter of the nozzles and are mixed together and caused to react with each other and at the same time by use of a static mixing device which discharges a mixed reaction solution from the outlet having a diameter smaller than a diameter of the mixing field, the plurality of kinds of solutions are supplied to the mixing field as turbulent flows having a Reynolds number of not less than 10000 during the flow into the mixing field. Therefore, eddy viscosity is generated in the mixing field and the plurality of kinds of solutions are mixed together and caused to react with each other by this eddy viscosity, with the result that it is possible to instantaneously and efficiently cause the plurality of kinds of solutions to mix together and react with each other.

The ninth aspect of the present invention is that in the eight aspect, the remaining solutions are added as orthogonal flows which intersect a straight-ahead flow formed by said high-pressure jet stream almost at right angles.

In this manner, the remaining solutions are added as orthogonal flows which intersect a straight-ahead flow formed by said high-pressure jet stream almost at right angles, with the result that the remaining solutions are entrained in the eddy viscosity formed by the high-pressure jet stream, with the result that it is possible to form large eddy viscosity.

The tenth aspect of the present invention is that in the eight aspect, the high-pressure jet stream is spouted in thin film form into the mixing field.

In this manner, by spouting the high-pressure jet stream in thin film form, the entrainment field area of the plurality of kinds of solutions increases and hence it is possible to improve the mixing efficiency.

The eleventh aspect of the present invention is that in the first aspect, at least two kinds of metallic atoms constituting the alloy particle capable of forming the CuAu type or $Cu_3Au$ type hard magnetic ordered alloy phase are selected from the Groups 6, 8, 9 and 10 of the long periodic table and at least further one kind of metallic atom is selected from the Groups 11, 12, 13, 14 and 15, the content of the one kind of metal atom being 1 to 30 atom % of the whole alloy.

According to the eleventh aspect of the present invention, by adding at least further one kind of metallic atom is selected from the Groups 11, 12, 13, 14 and 15 to at least two kinds of metallic atoms selected from the Groups 6, 8, 9 and 10 of the long periodic table, it is possible to lower the transformation temperature in causing the transformation of the alloy phase of the alloy particle prepared in the alloy particle preparation step to occur from an unordered phase to an ordered phase in the magnetic particle formation step.

The twelfth aspect of the present invention is that in the first aspect, the mixing and reaction temperature in the alloy particle preparation step is controlled to the range of −5° C. to 30° C.

According to the twelfth aspect of the present invention, the mixing and reaction temperature in the alloy particle preparation step can be controlled in the range of −5° C. to 30° C. If the mixing and reaction temperature is less than −5° C., this poses the problem that a water phase condenses, making a reduction reaction nonuniform. If the mixing and reaction temperature exceeds 30° C., coalescence and precipitation tend to occur and the system may sometimes become unstable. The mixing and reaction temperature is preferably in the range of 0° C. to 25° C. and especially preferably in the range of 5° C. to 25° C.

The thirteenth aspect of the present invention is that in the first aspect, in the magnetic particle formation step annealing treatment is performed after the application of an alloy-particle-containing solution, which contains the alloy particle prepared in the alloy particle preparation step, over a backing material.

Although the alloy particle prepared in the alloy particle preparation step has weak magnetism, it is necessary to cause the alloy phase of the alloy particle to undergo transformation from an unordered phase to an ordered phase in order to obtain a CuAu type or $Cu_3Au$ type hard magnetic ordered alloy having a coercive force of not less than 1200 Oe, which is required in a magnetic recording medium. However, if this annealing treatment is performed in the state of a particle, alloy particles are apt to coalesce together.

According to the thirteenth aspect of the present invention, annealing treatment is performed after the application of an alloy-particle-containing solution, which contains the alloy particle prepared in the alloy particle preparation step, over a backing material. Therefore, it is possible to prevent the coalescence of alloy particles and it is possible to form an alloy particle having a micro size. In this case, also the particle size of the magnetic particle formed by annealing treatment is preferably in the range of 1 to 100 nm, more preferably in the range of 3 to 20 nm and especially preferably in the range of 3 to 10 nm. Furthermore, the coefficient of variation in the particle size of the magnetic particle formed by annealing treatment is also preferably not more than 15% and more preferably not more than 10%.

The fourteenth aspect of the present invention is that in the thirteenth aspect, the annealing treatment temperature in the annealing treatment is controlled in the range of 100° C. to 500° C.

The fifteenth aspect of the present invention is a magnetic particle manufactured by the method of manufacturing a magnetic particle according to any one of the first to fourteenth aspects, and the sixteenth aspect is a magnetic recording medium containing the magnetic particle according to the fifteenth aspect in a magnetic layer.

As described above, according to the method of manufacturing a magnetic particle of the present invention, it is possible to prepare an alloy particle which satisfies all the requirements for a micro size, monodispersibility and transformation facilitativeness in the alloy particle preparation step and, therefore, it is possible to manufacture a magnetic particle of good performance.

Furthermore, a magnetic recording medium of the present invention, which contains the magnetic particle manufactured by the invention in a magnetic layer, has lower noise level and high-quality performance of high recording density.

BRIEF DESCRIPTION OF THE DRAWINGS

FIG. 2 is an explanatory diagram to explain the action of mixing the solutions L1 and L2 using eddy viscosity in the one jet mixing method;

DETAILED DESCRIPTION OF THE PREFERRED EMBODIMENTS

Figure 1:
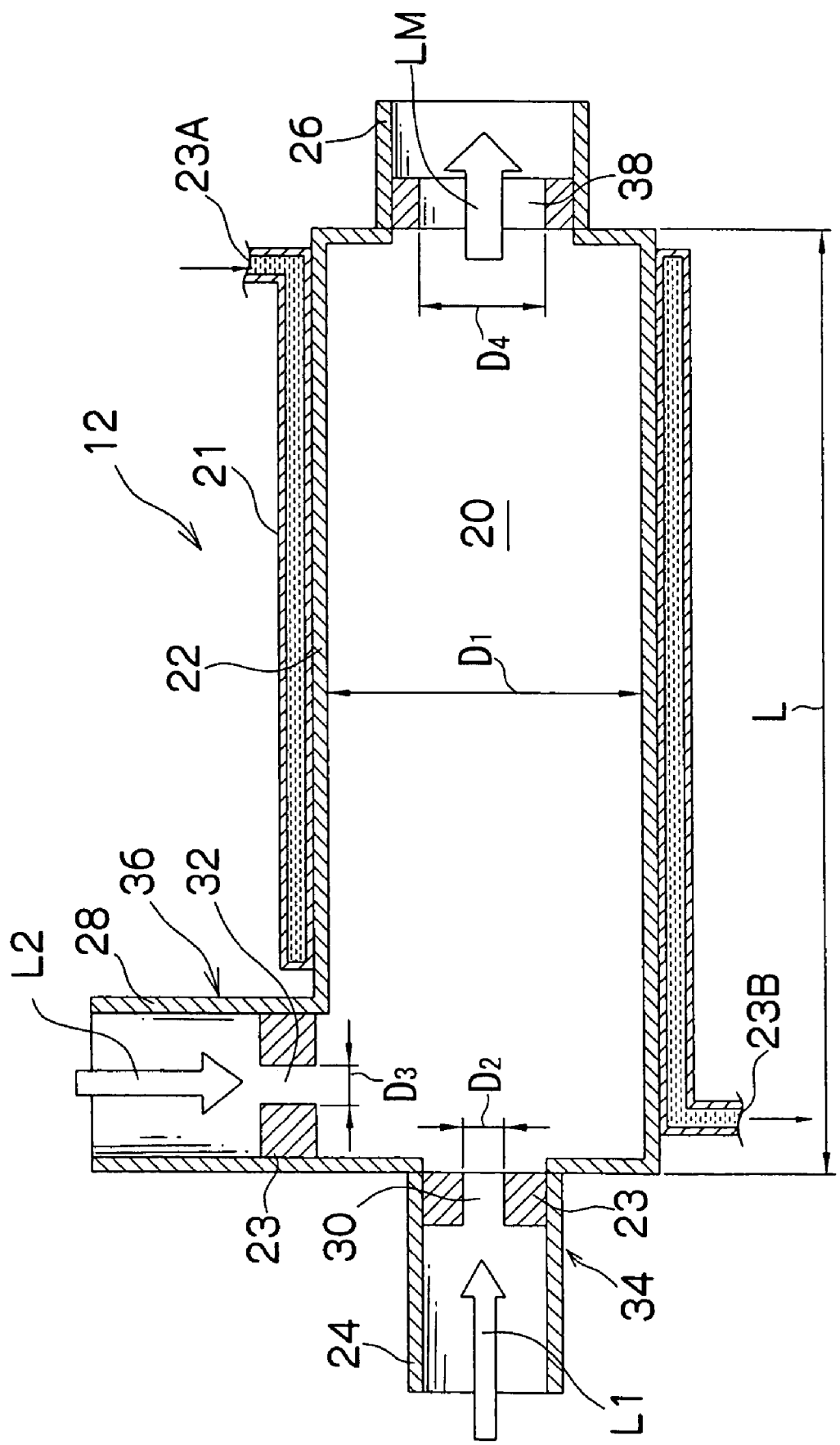
FIG. 1 is a conceptual diagram showing the construction of a static mixing device by which the one jet mixing method is performed in the alloy particle preparation step in the method of manufacturing a magnetic particle of the present invention.

Preferred embodiments of a method of manufacturing a magnetic particle, a magnetic particle and a magnetic recording medium related to the present invention will be described below with reference to the attached drawings.

A method of manufacturing a magnetic particle of the present invention comprises the alloy particle preparation step of preparing by a liquid phase process an alloy particle capable of forming a hard magnetic ordered alloy phase and the magnetic particle formation step of forming a CuAu type or $Cu_3Au$ type magnetic particle from the prepared alloy particle.

A method of manufacturing a magnetic particle and a magnetic particle of the present invention will be described below while describing each of the above steps. Incidentally, the magnetic particle formation step is an example of annealing treatment, which will be described below. However, the invention is not limited to this annealing treatment.

[Alloy Particle Preparing Step]

Although an alloy particle which becomes a magnetic particle after annealing treatment can be prepared by the gaseous phase process other than the liquid phase process, the liquid phase process is desirable in consideration of the excellent mass producibility. Although conventionally known various processes can be applied as the liquid phase process, it is preferred to adopt reduction processes developed by improving the conventional liquid phase processes, and among the reduction processes, the reversed micelle process by which it is easy to control the particle size of an alloy particle is especially preferable.

The reversed micelle process comprises the reduction step in which a reduction reaction is caused to occur by mixing at least two kinds of reversed micelle solutions and the aging step of aging at a treatment temperature after the reduction reaction.

(Reduction Step)

In the reduction step, a reversed micelle solution (Solution L1), which is obtained by mixing a nonaqueous organic solvent containing a surfactant and a reducing aqueous solution, is prepared. This reversed micelle solution (Solution L1) is hereinafter referred to simply as the solution L1.

An oil soluble surfactant is used as the surfactant. Concretely, the sulfonic acid type (for example, erosol OT (made by Wako Pure Chemical Industries, Ltd.), the class 4 ammonium salt type (for example, cetyl trimethylammonium bromide), the ether type (for example, pentaethylene glycol dodecyl ether), etc. can be enumerated.

It is preferred that the amount of the surfactant in the nonaqueous organic solvent be 20 to 200 g/l.

Alkanes, ethers, alcohols, etc. are enumerated as those which are desirable as the nonaqueous organic solvent which dissolves the surfactant. Alkanes with carbon numbers 7 to 12 are desirable as alkanes. Concretely, heptane, octane, isooctane, noane, decane, undecane, dodecane, etc. are desirable. Diethyl ether, dipropyl ether, dibutyl ether, etc. are desirable as ethers. Ethoxyethanol, ethoxypropanal, etc. are desirable as alcohols.

Although, compound containing alcohols, polyalcohols, $H_2$, HCHO, $S_2O_6^{2-}$, $H_2PO_2^-$, $BH_4^-$, $N_2H_{5+}$, $H_2PO_3^-$, etc. as the reductant in the aqueous reductant solution may be use singly, it is desirable to use two kinds or more in combination. It is preferred that the amount of the reductant in the aqueous solution be 3 to 50 moles to 1 mole of metal salt.

It is preferred that the mass ratio of the water to the surfactant in the solution L1 (water/surfactant) be not more than 20. If the mass ratio exceeds 20, this poses the problem that precipitation is apt to occur and that particles are also apt to become irregular. The mass ratio is more preferably not more than 15 and especially preferably 0.5 to 10.

Next, apart from the above-described solution L1, a reversed micelle solution (Solutions L2), which is obtained by mixing a nonaqueous organic solvent containing a surfactant and an aqueous metallic salt solution containing a plurality of kinds of metallic atoms constituting the alloy particle, are prepared. This reversed micelle solution (Solution L2) is hereinafter referred to simply as the solution L2.

In this case, the solution L1, which is obtained by mixing a nonaqueous organic solvent containing a surfactant and an aqueous reductant solution, and a reversed micelle solution (Solution L3), which is obtained by mixing a nonaqueous organic solvent containing a surfactant and an aqueous metallic salt solution containing one of a plurality of kinds of metallic atoms constituting the alloy particle, are prepared, the number of prepared Solutions L3 being equal to the number of the plurality of kinds of metallic atoms. The reversed micelle solution (Solution L3) is hereinafter referred to simply as the solution L3.

The conditions (substances to be used, concentrations, etc.) for the surfactant and the nonaqueous organic solvent are the same as the solution L1. Incidentally, the same solution as the solution L1 or dissimilar solutions may be used. Furthermore, the mass ratio of the water to the surfactant in the solution L2 are also the same as the solution L1, and the mass ratio may be the same as with the solution L1 or may be different.

It is desirable to appropriately select the metallic salt contained in the aqueous metallic salt solution so that the magnetic particle to be prepared can form a CuAu type or $Cu_3Au$ type hard magnetic ordered alloy.

FeNi, FePd, FePt, CoPt, CoAu, etc. can be enumerated as CuAu type hard magnetic ordered alloys, and among others, FePd, FePt and CoPt are desirable. $Ni_3Fe$, $FePd_3$, $Fe_3Pd$, $Fe_3Pt$, $Co_3Pt$, $FePt_3$, $CoPt_3$, $Ni_3Pt$, $CrPt_3$ and $Ni_3Mn$ can be enumerated as $Cu_3Au$ type hard magnetic ordered alloys and, among others, $FePd_3$, $FePt_3$, $CoPt_3$, $Fe_3Pd$, $Fe_3Pt$ and $Co_3Pt$ are desirable.

As concrete examples of metallic salts, it is possible to enumerate $H_2PtCl_6$, $K_2PtCl_4$, Pt $(CH_3\ COCHCOCH_3)_2$, $Na_2PdCl_4$, Pd $(OCOCH_3)_2$, $PdCl_2$, $Pd(CH_3\ COCHCOCH_3)_2$, $HAuCl_4$, $Fe_2\ (SO_4)_3$, Fe $(NO_3)_3$, $(NH_4)_3Fe\ (C_2O_4)_3$, Fe $(CH_3\ COCHCOCH_3)_3$, $NiSO_4$, $CoCl_2$, $Co(OCOCH_3)_2$, etc.

The concentration of the aqueous metallic salt solution (as the metallic salt concentration) is preferably 0.1 to 1000 µmol/ml and more preferably 1 to 100 µmol/ml.

It is necessary to cause an alloy particle to undergo the transformation of the alloy phase from an unordered phase to an ordered phase by the annealing treatment which will be described later. It is preferred that at least two kinds of metallic atoms constituting the alloy particle capable of forming the CuAu type or $Cu_3Au$ type hard magnetic ordered alloy phase be selected from the Groups 6, 8, 9 and 10 of the long periodic table and that at least further one kind of metallic atom be selected from the Groups 11, 12, 13, 14 and 15, the content of the one kind of metallic atom being 1 to 30 atom % of the whole alloy. For example, by adding one kind of metallic atom (hereinafter referred to as "a third element") selected from the Groups 11, 12, 13, 14 and 15, such as Sb, Pb, Bi, Cu, Ag, Zn and In, to a binary alloy constituted by two kinds of metallic atoms selected from the Groups 6, 8, 9 and 10 of the long periodic table, it is possible to lower the transformation temperature in causing the transformation of the alloy phase of the alloy particle from an unordered phase to an ordered phase.

The solutions L1 and L2 thus prepared are mixed together. In the present invention, at least one of the plurality of solutions L1, L2 is mixed by a high-pressure mixing method which involves supplying the solution to the mixing field by a high-pressure jet stream of not less than 1 MPa, with the result that an alloy particle which meets all of the requirements for a micro size, monodispersibility and transformation facilitativeness is prepared in the alloy particle preparation step.

As the types of the high-pressure mixing method, it is possible to favorably use [1] the one jet mixing method, [2] the T-shaped and Y-shaped mixing methods, and [3] parallel flow mixing method. The mixing method is described below.

[1] One Jet Mixing Process

FIG. 1 is a conceptual diagram showing the preferred construction of a static mixing device 12 by which the one jet mixing method is performed.

As shown in FIG. 1, in the static mixing device 12, a first introduction pipe 24 is connected to an opening on the side of one end of a mixer 22, in which a cylindrical mixing chamber 20 (a mixing field) where the solutions L1 and L2 are mixed together and caused to react with each other is formed, the first introduction pipe 24 serving to introduce the solution L1 into the mixing chamber 20, and a discharge pipe 26 for a mixed reaction solution which is obtained by mixing and reaction in the mixing chamber 20 is connected to an opening on the side of the other end. Furthermore, a second introduction pipe 28 which introduces the solution L2 into the mixing chamber 20 is connected near the outlet of the first introduction pipe 24 on the lateral side of the mixer 22. A first orifice 30 and a second orifice 32 are formed respectively in the interior of the leading ends of the first introduction pipe 24 and the second introduction pipe 28, whereby in the first introduction pipe 24 and the second introduction pipe 28, a first nozzle 34 and a second nozzle 34 which spout turbulent flow liquid are formed. Although in FIG. 1 the solution L1 is introduced from the first introduction pipe 24 and the solution L2 is introduced from the second introduction pipe 28, it is possible to reverse the two solutions. In consideration of the uniformity of reduction, however, it is desirable to introduce the solution L1 into the first introduction pipe 24 and spout this solution as a high-pressure jet stream from the first orifice 30 into the mixing chamber 20 and to introduce the solution L2 into the second introduction pipe 28 and add this solution from the second orifice 32. Furthermore, the discharge pipe 26 may be connected to the lateral side portion of the mixer 22 if this portion is near to the side of the other end of the mixer 22.

Furthermore, a jacket 21 through which a heating medium of a relatively large heat capacity such as water and oil flows, is wound around the outer circumference of the mixer 22, and a heating medium inlet 23A and a heating medium outlet 23B of the jacket are connected to a heating medium supply device, which is not shown in the drawing. From the heating medium supply device is supplied a heating medium capable of controlling the mixing and reaction temperature of the solutions L1 and L2 within the mixer 22 to the range of −5° C. to 30° C. to the jacket 21, and the heating medium is again circulated to the heating medium supply device. It is preferred that the mixing and reaction temperature of the solutions L1 and L2 be appropriately controlled to the range of −5° C. to 30° C. depending on the kinds of the solutions L1 and L2, the more preferred range of the mixing and reaction temperature is 0° C. to 25° C., and the more preferred range of the mixing and reaction temperature is 5° C. to 25° C. In a case where it is difficult to raise the mixing and reaction temperature to a set temperature only by winding the jacket 21 around, though this depends also on the amounts of the solutions L1 and L2 which are mixed together and caused to react with each other within the mixer 22, it is possible to provide a temperature regulator in preparation tanks which prepare the solutions L1 and L2, which are not shown.

Incidentally, as in the case of the solution L3, when the same number of aqueous metallic salt solutions as the number of the plurality of kinds of metallic atoms are prepared and theses plurality of solutions L3 and the solution L1 are mixed together, one of these solutions may be supplied as a high-pressure jet stream of not less than 1 MPa. Therefore, the nozzle position of spouting the solution L3 may be provided in a plurality of places on the lateral side of the mixer 22 thereby to spout the plurality of solutions L3 or alternatively, the plurality of solutions L3 may be spouted in order from one nozzle position by dividing the period into the initial reaction period, the middle reaction period and the terminal reaction period. Therefore, although the number of nozzles for the high-pressure jet stream of a straight-ahead flow is basically one, there may be a plurality of nozzles for an orthogonal flow which intersects a straight-ahead flow at right angles.

In drilling the first and second orifices 30, 32 in a block orifice material 23, micromachining by cutting, micromachining by grinding, injection machining, micro electric-discharge machining, the LIGA process, lasermachining, SPM machining, etc. which are publicly known can be advantageously used as a method of precisely piercing a spout hole of about 100 μm in the orifice material 23 of metal, ceramics, glass, etc.

As the material quality for the orifice material 23, those having good workability and hardness close to that of diamond are desirable. Therefore, in the case of materials other than diamond, it is possible to advantageously use various kinds of metal and metallic alloy which are subjected to hardening treatment, such as quenching, nitriding treatment and sintering treatment, can be advantageously used. Furthermore, ceramics also have high hardness and better workability than diamond and can be advantageously used. Incidentally, although in this embodiment, the structure of the aperture diagram of the first nozzle 34 and the second nozzle 36 is described by the example of the orifice, it is possible to use other methods other than the orifice so long as they have the function of spouting turbulent flow liquid.

The first introduction pipe 24 and the second introduction pipe 28 are each provided with pressurization device not shown in the drawing so that the solution L1 and the solution L2 are supplied under pressure to the first and second nozzles 34, 36. However, the spouting pressure from the second nozzle 36 into the mixing chamber 20 is lower than the pressure of a high-pressure jet stream spouted from the first nozzle 34 into the mixing chamber 20. Although various device are known as pressurization device of applying a high pressure to a liquid and any device can be used, as relatively available inexpensive device it is desirable to use a reciprocating pump, such as a plunger plump and a booster pump. Because some rotary pumps are of a high-pressure generation type though the pressures generated by such a high-pressure generation type are not so high as those generated by a reciprocating pump, it is also possible to use such a rotary pump of a high-pressure generation type.

The solution L1 is spouted from the first nozzle 34 into the mixing chamber 20 as a high-pressure jet stream of not less than 1 MPa and as a turbulent flow having a Reynolds number of not less than 10000 during the flow into the mixing chamber 20, and the solution L2 having a lower pressure than the solution L1 is spouted from the second nozzle 36 into the mixing chamber 20 as an orthogonal flow which intersects the solution L1 almost at right angles. In this case, even when the solution L2 does not completely intersects the solution L1 at an angle of 90 degrees, this is allowed if the intersecting speed vector components are main components. Furthermore, the mixing and reaction temperature within the mixer 22 is controlled to the range of −5° C. to 30° C. by jacket 21 wound around the mixer 22 and/or the temperature regulator in a preparation tank which regulates the solutions L1 and L2. As a result of this, the solutions L1 and L2 are instantaneously and efficiently mixed together and caused to react with each other under appropriate mixing and reaction temperature conditions and a mixing and reaction solution LM which contains alloy particles (alloy-particle-containing solutions) is formed. The mixing and reaction solutions LM are instantaneously discharged from the discharge pipe 26. As a result, it is possible to form an alloy particle which has a particle size in the range of 1 to 100 nm and a coefficient of variation in the particle size of not more than 15% and is excellent in the self-assembling property.

As schematically shown in FIG. 2, in this mixing and reaction, entrained flows which are entrained by the solution L1 of a high-speed turbulent-flow high-pressure jet stream include the solution L2 spouted at almost right angles with the solution L1, with the result that the solutions L1 and L2 are mixed together to generate large eddy viscosity. And by using this large eddy viscosity, a high-performance mixing efficiency is obtained and the above-described mixing chamber 20, first and second nozzles 34, 36 and discharge pipe 26 of the static mixing device 12 are formed so as to provide the following relationship.

That is, it is important that eddy viscosity be formed in the mixing chamber 20 and hence the cylinder diameter $D_1$ of the mixing chamber 20 is formed so as to have a larger diameter than the orifice diameter $D_2$ of the first nozzle 34 and the orifice diameter $D_3$ of the second nozzle 36. In particular, the eddy viscosity formed by the straight-ahead flow A is important for improving the mixing efficiency and the dimensional ratio of the cylinder diameter $D_1$ of the mixing chamber 20 to the orifice diameter $D_2$ of the first nozzle 34 is preferably in the range of 1.1 times to 50 times and more preferably in the range of 1.1 times to 20 times. Furthermore, in order to ensure that the solution L2 of the orthogonal flow B is easily included by the solution L1 of the orifice diameter $D_2$ of the straight-ahead flow A, it is preferred that the spout stream velocity of the orthogonal flow B be lower than the spout velocity of the straight-ahead flow A by lowering the pressure of the orthogonal flow B than the pressure of the straight-ahead flow A. Concretely, the flow velocity ratio of the spout flow velocity of the orthogonal flow B to the spout flow velocity of the straight-ahead flow A is preferably 0.05 time to 0.4 time and more preferably 0.1 time to 0.3 time.

Furthermore, it is necessary that the orthogonal flow B be spouted into the mixing chamber 20 in a position before the eddy viscosity C formed by the spouting of the straight-ahead flow A from the small-diameter first nozzle 34 into the larger-diameter mixing chamber 20 obtains a maximum value, and it is necessary that the second nozzle 36 be disposed between the first nozzle 34 and the maximum position of the eddy viscosity C. Therefore, it is necessary to get to know the position where the eddy viscosity C obtains a maximum value. The position of the mixing chamber 20 where the eddy viscosity C obtains a maximum value can be grasped by performing a simulation beforehand by using the numerical analysis software made by Rflow Co., Ltd. R-Flow, which has already been commercially available as flow analysis software in Japan and is known well as flow analysis software. Because in this case, as is apparent from FIG. 2, the position where the eddy viscosity C obtains a maximum value is not a pin point and instead has a region, it is necessary only that the maximum point of the eddy viscosity C be point P which is a rough center portion of the eddy viscosity C. Therefore, the position of the second nozzle 36 may be determined before point P. However, more preferably, the position of the second nozzle is determined so that the orthogonal flow B can be spouted in the initial stage of the formation of the eddy viscosity C.

When an analysis is made using the above numerical analysis software, it becomes apparent that the center point P of the region where the eddy viscosity C appears has a relation to the flow velocity of the straight-ahead flow A and almost corresponds to a position where the maximum flow velocity of the straight-ahead flow A (usually, the flow velocity in the position of the first nozzle) decreases to $1/10$. Therefore, if the position where the maximum flow velocity of the straight-ahead flow A decreases to $1/10$ is calculated and the position of the second nozzle 36 is determined so that the orthogonal flow B can be spouted before that point, it is unnecessary to calculate point P.

Furthermore, it is necessary to ensure the length L (see FIG. 1) of the mixing chamber 20 necessary for the formation of the maximum eddy viscosity C in the mixing chamber 20. If this length is too large, the mixed reaction solutions LM become apt to cause retention and back flow in the mixing chamber 20, having an adverse effect on the refinement of the particle size and monodispersibility of an alloy particle. Therefore, the length L of the mixing chamber 20 is preferably twice to 5 times the distance from the first nozzle 34 to point P which is the maximum point of the eddy viscosity C and more preferably twice to three times the distance.

In addition, if a liquid is spouted with high-speed flow from the first nozzle 34 and the second nozzle 36, which have a small diameter, into the mixing chamber 20 having a larger diameter than the diameter, cavitation is apt to occur and a gas-liquid interface is formed in the mixing chamber 20 by this cavitation, lowering the mixing efficiency. Therefore, in order to raise the mixing efficiency by using the eddy viscosity C, it is necessary to ensure that no gas-liquid interface is formed in the mixing chamber 20. Therefore, as shown in FIG. 1, it is necessary that the diameter $D_4$ of the discharge pipe 26 be made smaller than the cylinder diameter $D_1$ of the mixing chamber 20 by reducing the discharge diameter 26 by use of a third orifice 38 and to perform mixing with the pressure of the mixing chamber 20 kept raised. As a result of this, cavitation can be eliminated and hence the mixing efficiency is further improved. Incidentally, in order to minimize the retention time in the portion of the interior of the discharge pipe 26 which does not contribute to mixing, it is advisable to reduce the outlet of the mixing chamber 20 and, at the same time, to minimize the length of the discharge pipe 26 having an inside diameter which is smaller at least than the cylinder diameter $D_1$ of the mixing chamber 20, whereby the discharge pipe 26 is connected to a growth tank 16.

The shape of the spout flow spouted from the first nozzle 34 into the mixing chamber 20 is controlled by the first orifice 30 provided in the first nozzle 34, and this shape of the spout flow has an effect on the mixing performance. Therefore, it is desirable to appropriately use the first orifice 30 which forms various shapes of the spout flow, such as a string-like shape, a conical shape, slit-like shape and a fan-like shape, depending on the purpose of the mixing and reaction. For example, in a case where the reaction rate is on the order of milliseconds and very high, it is necessary to spout the straight-ahead flow A and the orthogonal flow B so that the eddy viscosity C obtains a maximum value instantaneously and within the narrowest possible range and the first orifice 30 which forms a string-like spout flow shape is desirable. When the reaction rate is relatively low, it is advisable to increase the entrainment field area formed by the straight-ahead flow A by spouting the straight-ahead flow A and the orthogonal flow B so that the eddy viscosity C obtains a maximum value within the widest possible range. And in this case, the first orifice 30 which forms a thin-film spout flow shape is desirable. Furthermore, when the reaction is intermediate between a very high reaction rate of millisecond order and a relatively low reaction rate, it is desirable to use the first orifice 30 which forms a conical spout flow shape.

FIGS. 3A to 3C to FIGS. 6A to 6C show the first orifice 30 for forming each of the string-like, conical, slit-like and fan-like spout flow shapes, respectively. In the figures, A is a view as viewed from the leading end side of the orifice, B is a longitudinal cross-sectional view of the orifice, and C is a lateral cross-sectional view of the orifice.

Figure 3A:
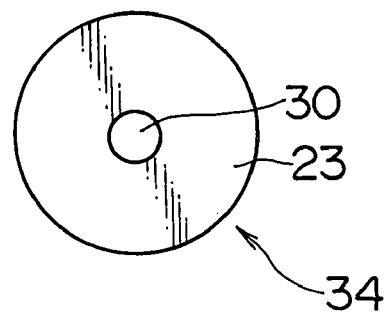
FIGS. 3A to 3C are each an explanatory diagram to explain a string-like spout flow shape.
Figure 3B:
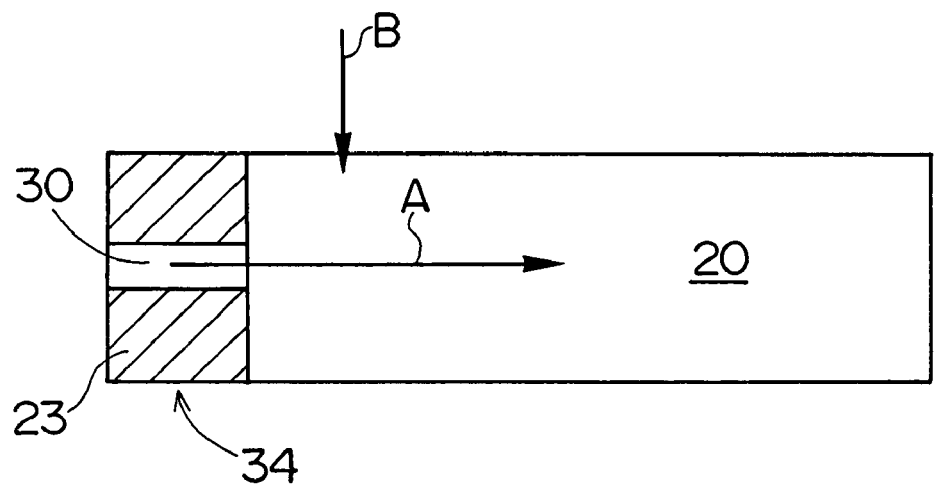
Figure 3C:
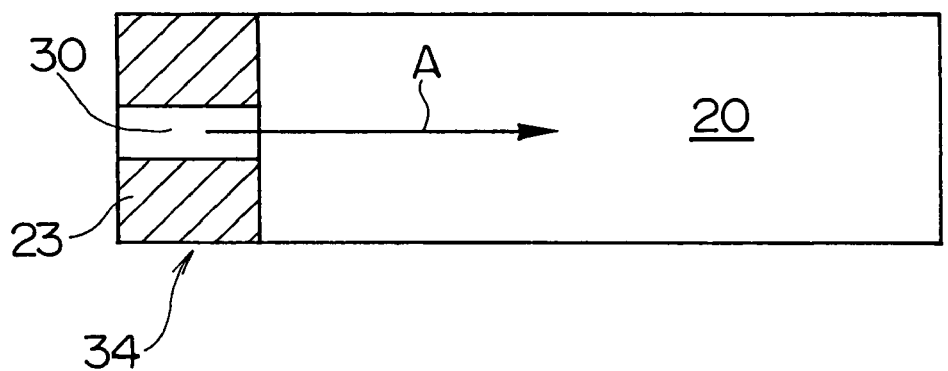
Figure 4A:
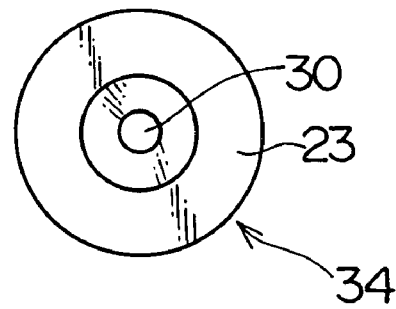
FIGS. 4A to 4C are each an explanatory diagram to explain a conical spout flow shape.
Figure 4B:
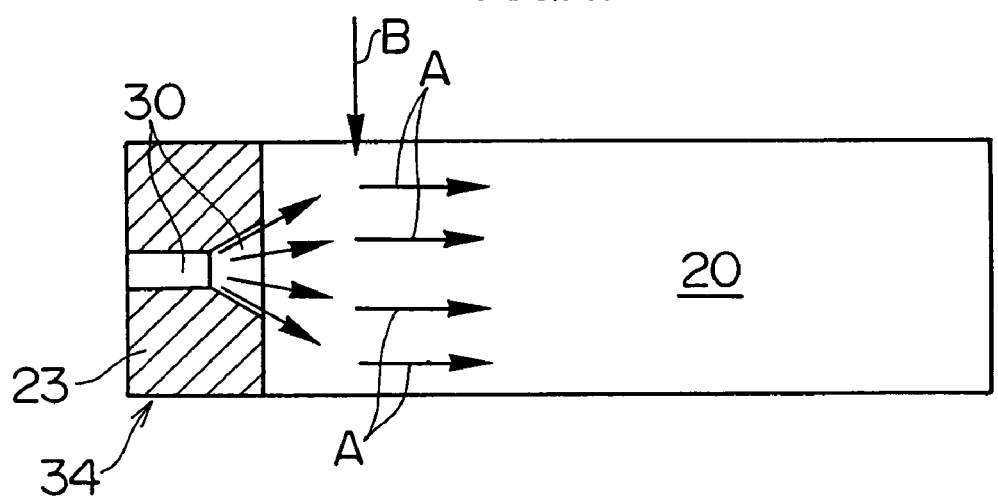
Figure 4C:
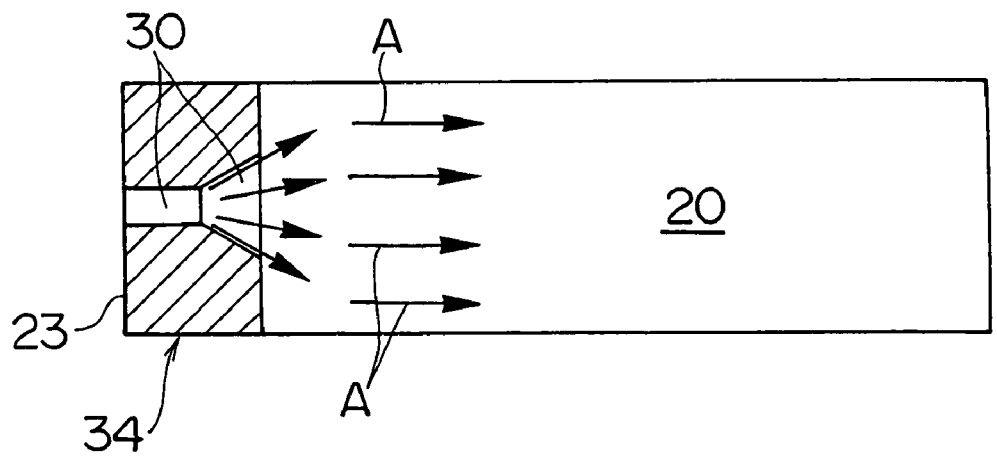
Figure 5A:
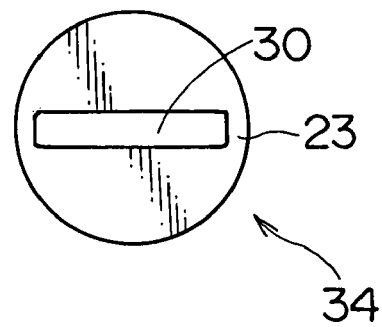
FIGS. 5A to 5C are each an explanatory diagram to explain a slit-like spout flow shape.
Figure 5B:
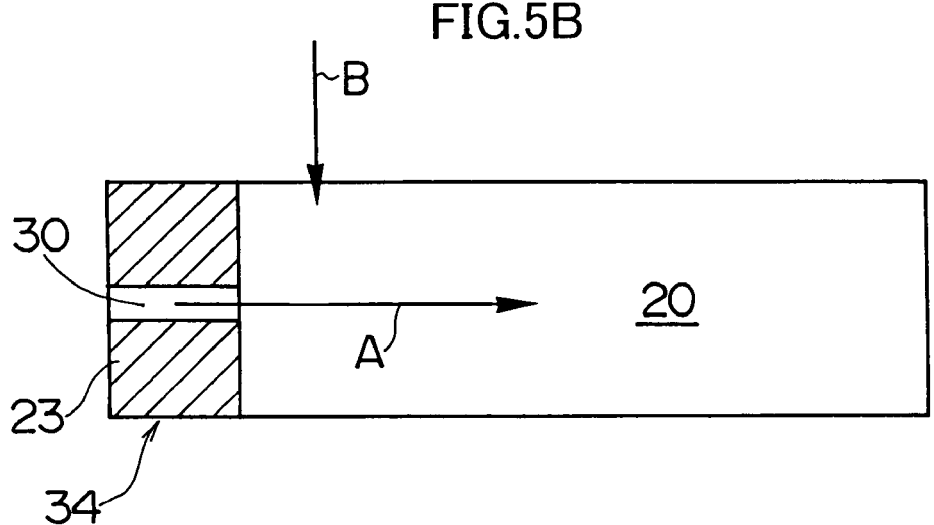
Figure 5C:
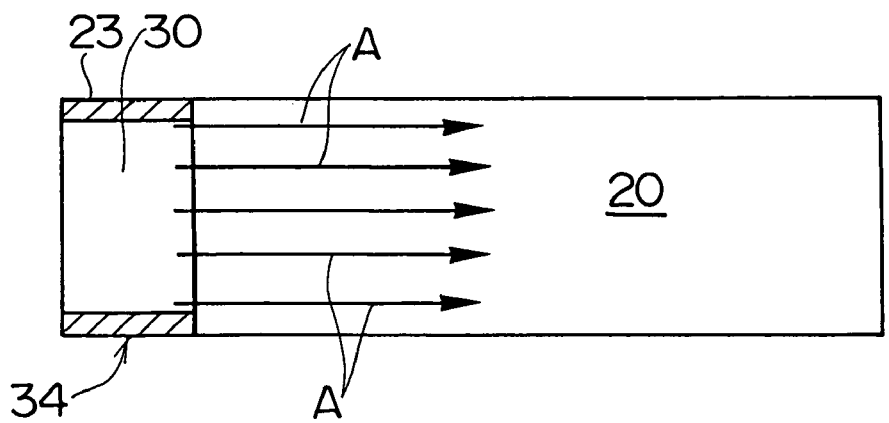
Figure 6A:
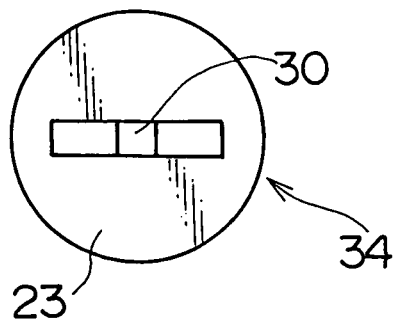
FIGS. 6A to 6C are each an explanatory diagram to explain a fan-like spout flow shape.
Figure 6B:
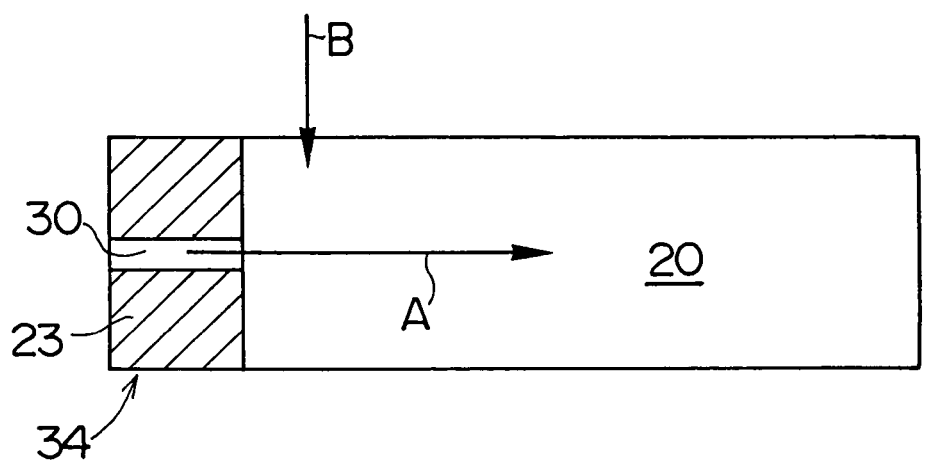
Figure 6C:
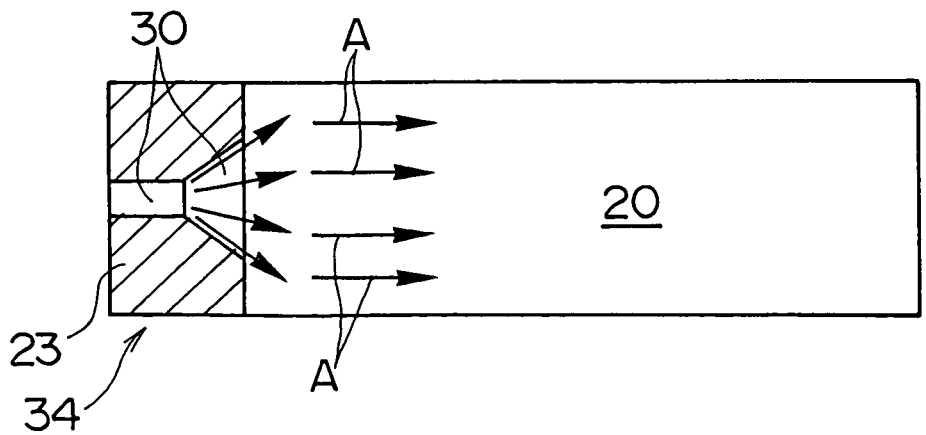

FIGS. 3A to 3C show the first orifice 30 for spouting the string-like straight-ahead flow A into the mixing chamber 20 and is formed in string form. FIGS. 4A to 4C show the first orifice 30 for spouting the conical straight-ahead flow A into the mixing chamber 20 and is formed in trumpet form with an open end. FIGS. 5A to 5C show the first orifice 30 for spouting the thin-film straight-ahead flow A into the mixing chamber 20 and is formed in rectangular slit form. FIGS. 6A to 6C show the first orifice 30 for spouting the thin-film fan-like straight-ahead flow A into the mixing chamber 20 and is formed in such a manner that the leading end is expanded in diameter like the shape of a fan.

Incidentally, the static mixing device 12 for performing the one jet mixing method is not limited to the above-described FIG. 1 and any static mixing device may be used if it ensures that the solutions L1 and L2 are spouted from the respective nozzles to the mixing field having a diameter larger than a bore diameter of the nozzles and are mixed together and caused to react with each other and that at the same time by use of a static mixing device which discharges mixed reaction solutions from the outlet having a diameter smaller than a diameter of the mixing field, at least either of the solutions L1 and L2 is supplied to the mixing field as the high-pressure jet stream of not less than 1 MPa and as a turbulent flow having a Reynolds number of not less than 10000 during the flow into the mixing field, and the remaining solution is added at a lower pressure than the high-pressure jet stream in a position where the eddy viscosity which the high-pressure jet stream forms with respect to the direction of flow does not yet obtain a maximum value.

[2] T-Shaped and Y-Shaped Mixing Methods

Figure 7:
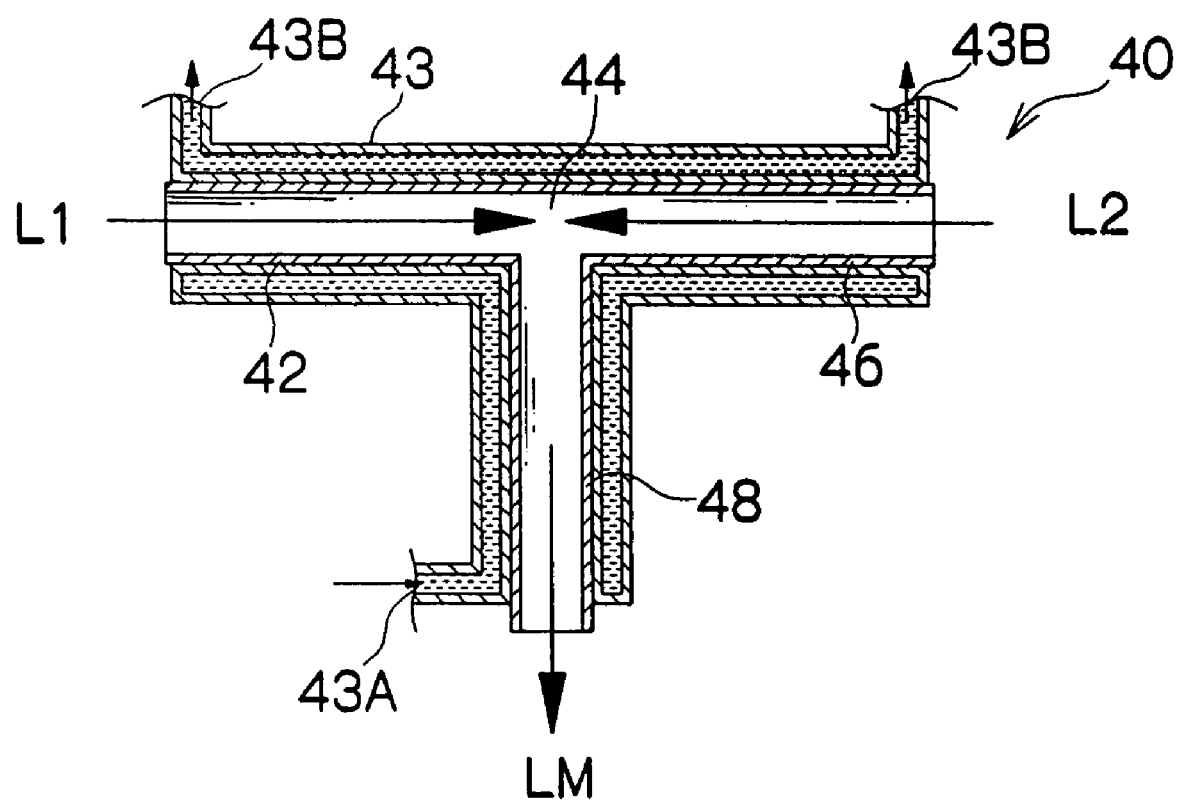
FIG. 7 is a conceptual diagram showing the construction of a mode of a static mixing device for carrying out the T-shaped mixing method in the alloy particle preparation step in the method of manufacturing a magnetic particle of the present invention.
Figure 8:
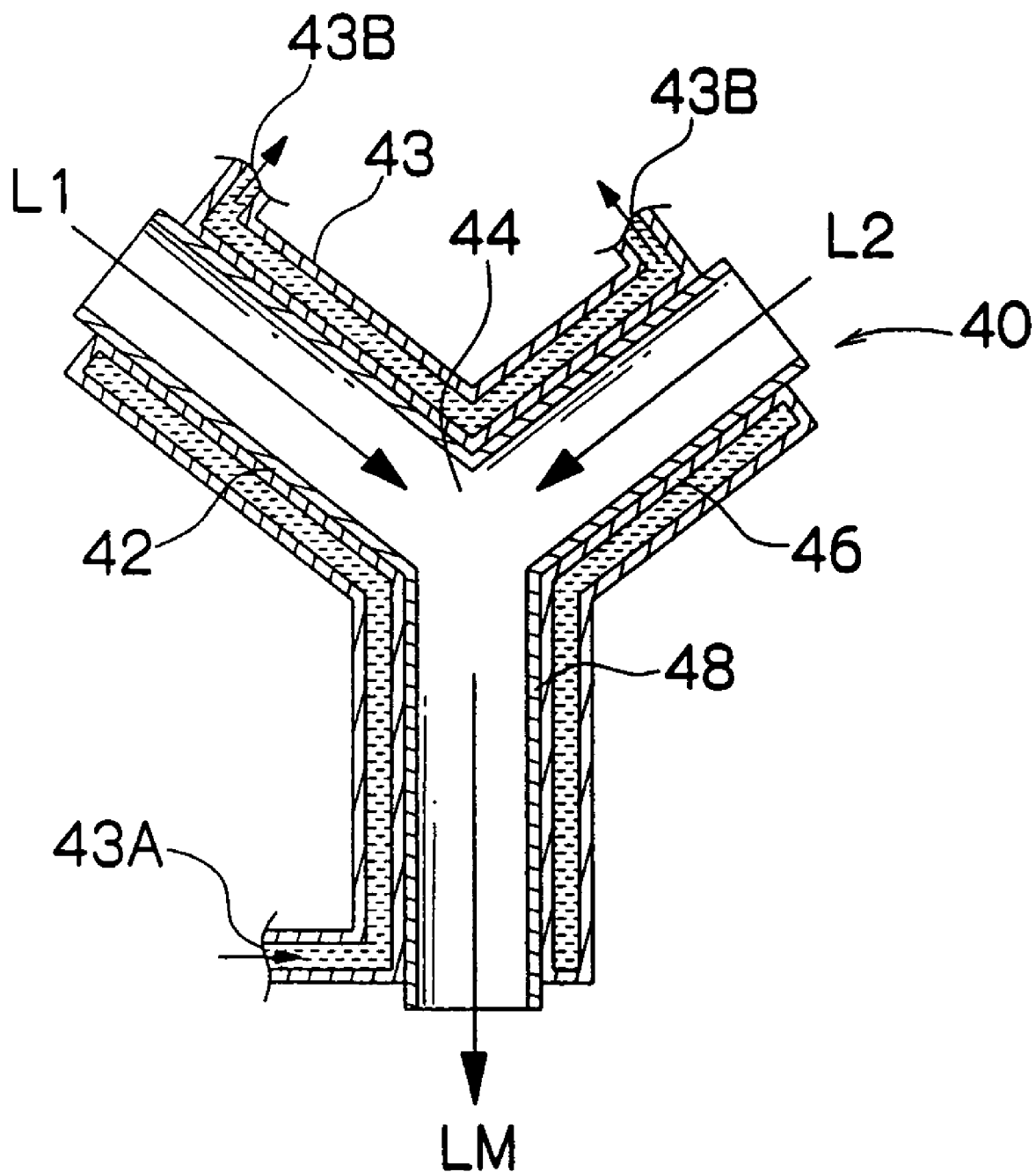
FIG. 8 is a conceptual diagram showing the construction of a mode of a static mixing device for carrying out the Y-shaped mixing method in the alloy particle preparation step in the method of manufacturing a magnetic particle of the present invention.

FIG. 7 and FIG. 8 are each a conceptual diagram showing the construction of a preferred mode of the static mixing device 40 for carrying out the T-shaped mixing method and the Y-shaped mixing method, respectively. FIG. 7 shows the case of a T-shaped pipe and FIG. 8 shows the case of a Y-shaped pipe.

As shown in FIG. 7 and FIG. 8, at an intersecting point (a mixing field) of a very fine pipe such as a T-shaped pipe and a Y-shaped pipe, the solutions L1 and L2 are caused to collide with each other as high-pressure jet streams of not less than 1 MPa, whereby the two solutions are instantaneously mixed together and caused to react with each other and a mixed reaction solution is discharged from a discharge pipe in a short time. That is, the solution L1 is spouted from a first addition pipe 42 into a mixing field 44 as a high-pressure jet stream of not less than 1 MPa and, at the same time, the solution L2 is spouted from a second addition pipe 46 into the mixing field 44 as a high-pressure jet stream of not less than 1 MPa, whereby the two solutions are caused to collide with each other. The mixed reaction solution LM obtained by the mixing and reaction by use of the energy of collision is discharged from a discharge pipe 48 in a short time. Incidentally, the pressure of the solutions L1 and L2 may be the same or different so long as the pressure is not less than 1 MPa. A jacket 43 is wound around the outer circumference of the first addition pipe 42, second addition pipe 46 and discharge pipe 48, and in the same manner as described in FIG. 1, the mixing and reaction temperature of the solutions L1 and L2 in the mixing field 44 is controlled. Also in this case, it is possible to provide a temperature regulator in preparation tanks which prepare the solutions L1 and L2, which are not shown in the figure. In FIG. 7 and FIG. 8, the reference numeral 43A denotes a heating medium inlet of the jacket 43 and the reference numeral 43B denotes a heating medium outlet.

As a result of this, the solutions L1 and L2 are instantaneously and efficiently mixed together and caused to react with each other under appropriate mixing and reaction temperature conditions and the mixed reaction solution LM containing alloy particles is formed. As a result, it is possible to form an alloy particle which has a particle size in the range of 1 to 100 nm and a coefficient of variation in the particle size of not more than 15% and is excellent in the self-assembling property.

Figure 9:
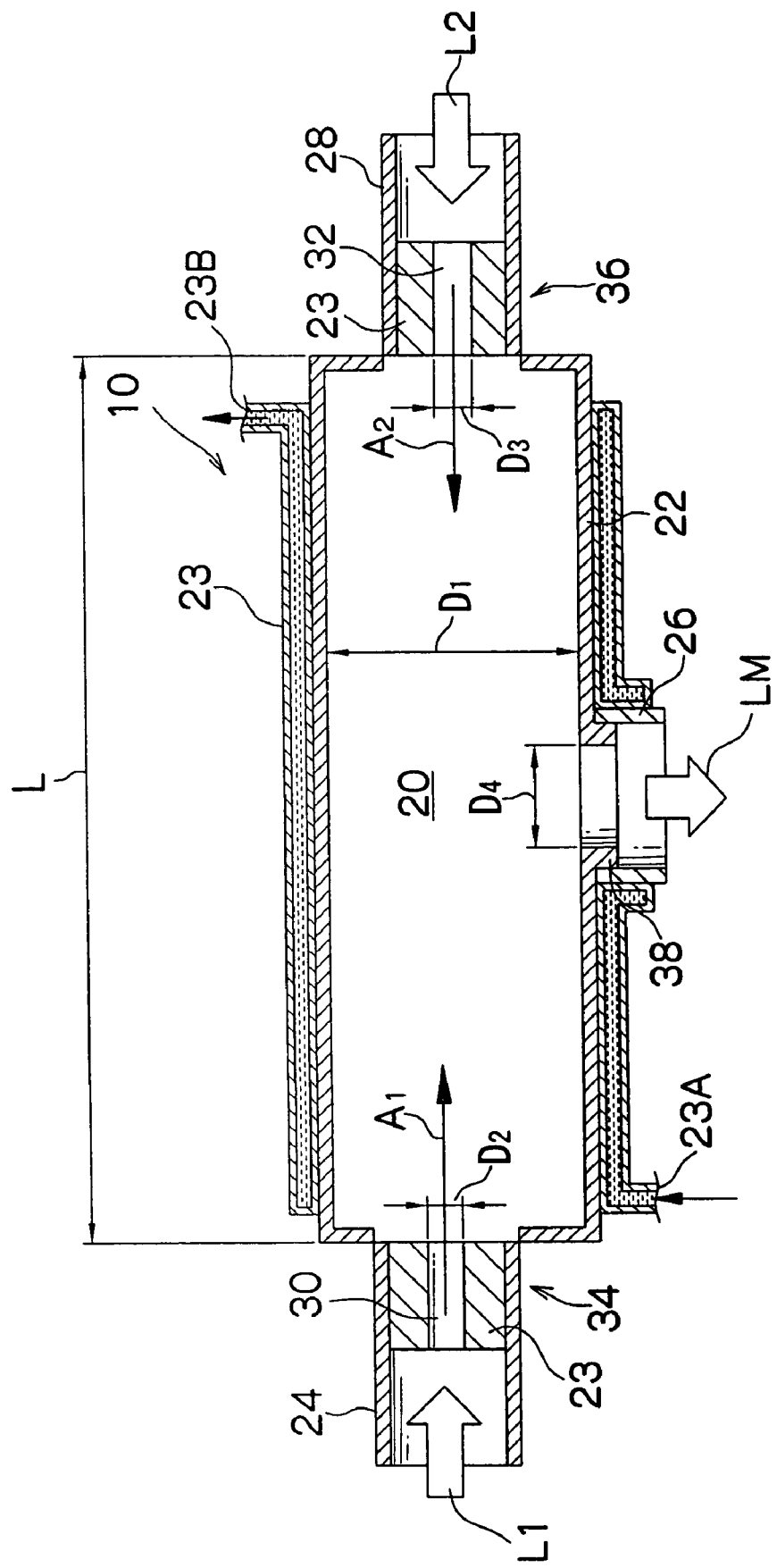
FIG. 9 is a conceptual diagram showing the construction of a mode of a static mixing device for carrying out the T-shaped mixing method in which the concept of eddy viscosity is considered in the alloy particle preparation step in the method of manufacturing a magnetic particle of the present invention.

FIG. 9 shows a mixing method obtained by adding the concept of eddy viscosity of FIG. 1 and FIG. 2 to the T-shaped mixing method. The solutions L1 and L2 are spouted into the mixing chamber 20 (mixing field) having a larger diameter than the diameter of the nozzles spouting the solutions L1 and L2 as high-pressure jet streams of not less than 1 MPa from opposite directions, caused to collide with each other, and mixed together by use of the eddy viscosity generated in the two solutions. The mixed reaction solution LM is discharged from the discharge pipe 26 having a smaller diameter than the diameter of the mixing chamber 20. Incidentally, the same members and phenomena as in FIGS. 1 and 2 are described by giving like reference numerals.

In the static mixing device 10 shown in FIG. 9, a first introduction pipe 24 is connected to an opening on the side of one end of a mixer 22, in which a cylindrical mixing chamber 20 (a mixing field) where the solutions L1 and L2 are mixed together and caused to react with each other is formed, the first introduction pipe 24 serving to introduce the solution L1 into the mixing field 20, and a second introduction pipe 28 which introduces the solution L2 into the mixing chamber 20 is connected to an opening on the side of the other end. Furthermore, a discharge pipe 26 which discharges from the mixing chamber 20 a mixed reaction solution LM which is obtained by mixing and reaction in the mixing chamber 20 is connected to an opening in the middle of the mixer 22.

A first orifice 30 and a second orifice 32 are provided respectively in the interior of the leading ends of the first introduction pipe 24 and the second introduction pipe 28, whereby in the first introduction pipe 24 and the second introduction pipe 28, a first nozzle 34 and a second nozzle 36 which spout straight-ahead flows $A_1, A_2$ as turbulent flows are provided. Although this embodiment is explained by an example in which the solution L1 is spouted from the first nozzle 34 and the solution L2 is spouted from the second nozzle 36, it is possible to reverse the two solutions.

A jacket 21 is wound around the outer circumference of the mixer 22 and as described in FIG. 1, the mixing and reaction temperature of the solutions L1 and L2 within the mixer 22 is controlled. Also in this case, it is possible to provide a temperature regulator in preparation tanks which prepare the solutions L1 and L2, which are not shown in the figure.

The cylinder diameter $D_1$ of the mixing chamber 20, the orifice diameter $D_2$ of the first nozzle 34, the orifice diameter $D_3$ of the second nozzle 36, and the dimensional relationship of these diameters are the same as in the one jet mixing method. Furthermore, the method of forming the first and second orifices 30, 32, the orifice material 23 and the pressurization device are also the same as described in the one jet mixing method. It is possible to form each of the string-like, conical, slit-like and fan-like spout flow shapes as the shapes of the straight-ahead flows $A_1, A_2$.

Figure 10:
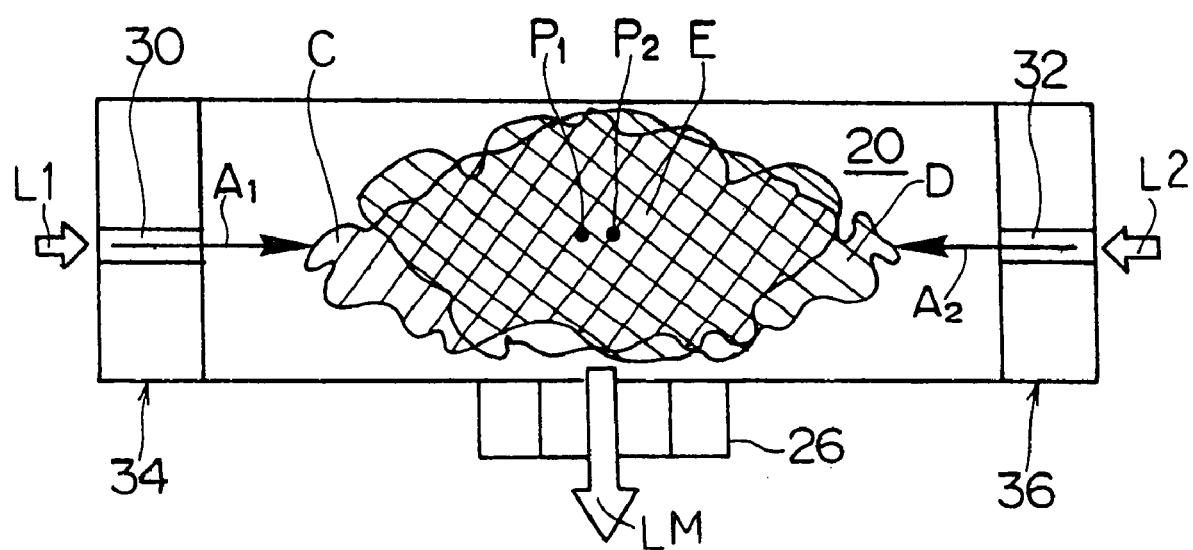
FIG. 10 is an explanatory diagram to explain the action of mixing the solutions L1 and L2 using eddy viscosity in the T-shaped mixing method.

As shown in FIG. 9 and FIG. 10, the solutions L1 and L2 are spouted through the first nozzle 34 and the second nozzle 36 as high-pressure jet streams of not less than 1 MPa from an end and the other end of the mixing chamber 20 and are caused to collide with each other in the mixing chamber 20 as the straight-ahead flows $A_1, A_2$ of opposed turbulent flows. By overlapping the two eddy viscosities C, D which are formed by these two straight-ahead flows $A_1, A_2$, the solutions L1 and L2 are instantaneously mixed together and caused to react with each other under appropriate mixing and reaction temperature conditions, and the mixed reaction solution LM which contains alloy particles is formed. As a result, it is possible to form an alloy particle which has a particle size in the range of 1 to 100 nm and a coefficient of variation in the particle size of not more than 15% and is excellent in the self-assembling property.

In this mixing and reaction, the respective eddy viscosities C, D formed in the mixing field 20 by the two high-speed straight-ahead flows $A_1, A_2$ of opposed turbulent flows obtain a maximum value and at this point of time, by overlapping the eddy viscosities C, D so that the overlapping portion E is maximized, a high-performance mixing efficiency is obtained. Therefore, it is preferred that the straight-ahead flows $A_1, A_2$ be not caused to collide with each other immediately after the spout into the mixing field 20 and that the overlapping portion E where the two eddy viscosities C, D formed in the mixing field 20 by the straight ahead flows $A_1$, $A_2$ overlap is maximized. For this purpose, it is desirable to appropriately set the distance L between the first nozzle 34 and the second nozzle 36 (refer to FIG. 9), in other words, the length of the mixing field. In this manner, by appropriately setting the distance L between the first nozzle 34 and the second nozzle 36, it is possible to positively increase the overlapping portion E of the maximized eddy viscosities C, D and it is also possible to almost completely overlap the two eddy viscosities C, D. Therefore, it is necessary to get to know the position at which the eddy viscosities C, D obtain a maximum value. The position of the mixing chamber 20 where the eddy viscosities C, D obtain a maximum value can be grasped by performing a simulation beforehand from the distance from the first nozzle 34 to the eddy viscosity C and the distance from the second nozzle 36 to the eddy viscosity D by using the numerical analysis software made by Rflow Co., Ltd. R-Flow, which has already been commercially available as flow analysis software in Japan and is known well as flow analysis software. In this case, as is apparent from FIG. 10, the positions where the eddy viscosities C, D obtain a maximum value are not pin points and instead have regions. Therefore, the positions where eddy viscosities C, D obtain a maximum value are regarded as points $P_1, P_2$ which are rough center portions of the eddy viscosities C, D and the total value of the distance from the first nozzle to point $P_1$ when the points $P_1$ and $P_2$ are matched and the distance from the second nozzle to point $P_2$ is regarded as the distance L between the first nozzle 34 and the second nozzle 36. There is another method of grasping points $P_1, P_2$. When analysis is made by the above-described numerical analysis software, it is found that points $P_1, P_2$ where the eddy viscosities C, D formed by the straight-ahead flows $A_1, A_2$ obtain a maximum value are related to the flow velocity of the straight-ahead flows $A_1, A_2$ and correspond to the position where the maximum flow velocity of the straight-ahead flows $A_1, A_2$ (usually, the flow velocity at the position of the first or second nozzle) decreases to $\frac{1}{10}$. Therefore, points $P_1, P_2$ my be grasped by calculating the position where the maximum flow velocity of the straight-ahead flows $A_1, A_2$ decreases to $\frac{1}{10}$. In this manner, by overlapping the eddy viscosities C, D in the position where the eddy viscosities C, D obtains a maximum value, it is possible to obtain the effect that the heat generation associated with the liquid-liquid friction by the collision of the straight-ahead flow $A_1$ and the straight-ahead flow $A_2$ with each other is suppressed in addition to the effect that the mixing and reaction performance is improved by raising the contact efficiency at the liquid-liquid interface between the straight-ahead flow $A_1$ and the straight-ahead flow $A_2$.

Incidentally, the static mixing devices 10, 40 for carrying out the T-shaped and Y-shaped mixing methods are not limited to those of FIG. 7 to FIG. 10 and any static mixing device may be used so long as it can cause all the solutions L1 and L2 to collide with each other in the mixing field as high-pressure jet streams of not less than 1 MPa.

[3] Parallel Flow Mixing Method

Figure 11:
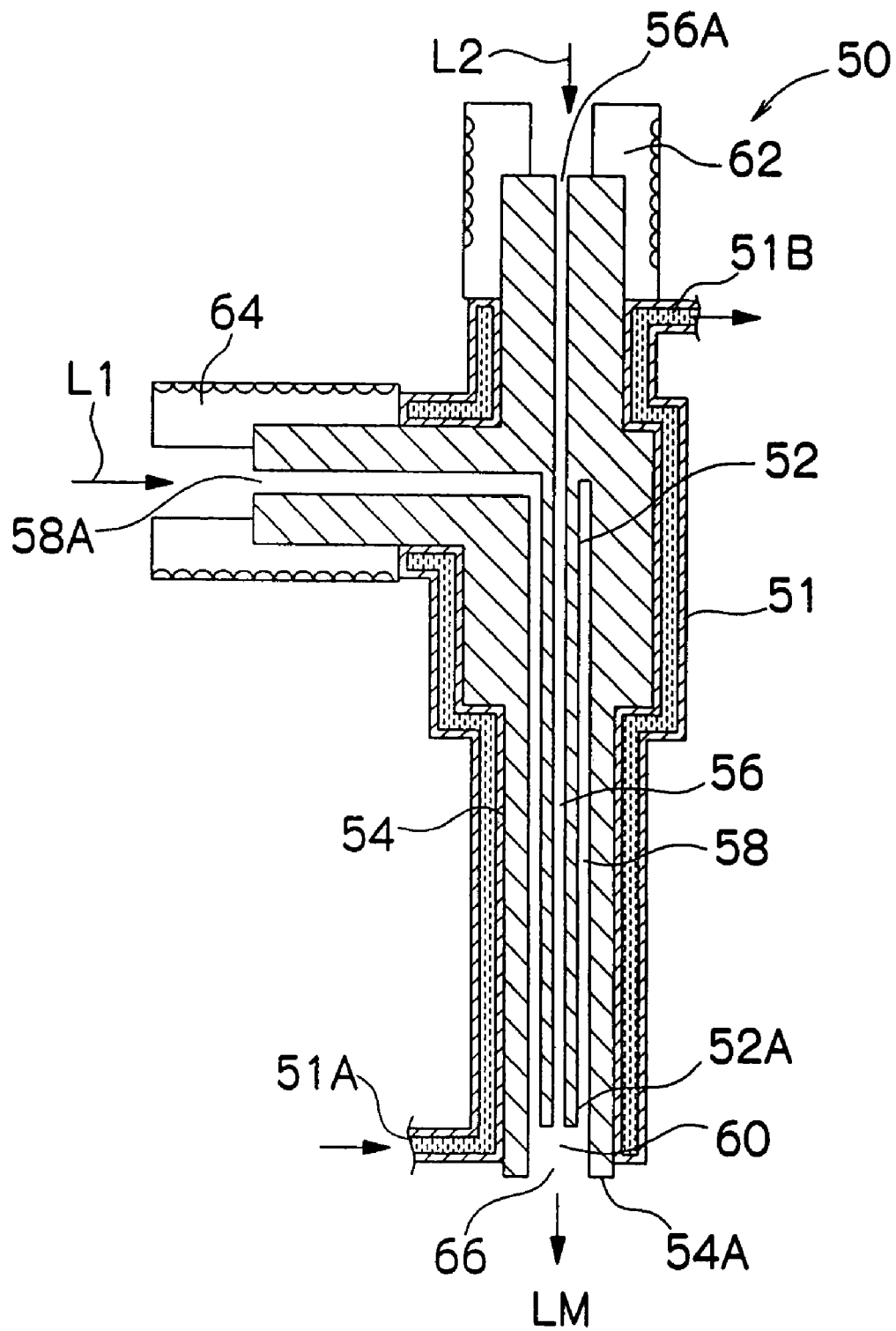
FIG. 11 is a conceptual diagram showing the construction of a mode of a static mixing device for carrying out the parallel flow mixing method in the alloy particle preparation step in the method of manufacturing a magnetic particle of the present invention.

FIG. 11 is a cross-sectional view showing the construction of a preferred mode of a static mixing device 50 for carrying out the parallel flow mixing method.

As shown in FIG. 11, a static mixing device 50 is formed to provide a concentric double cylindrical pipe structure of an inner pipe 52 and an outer pipe 54. As a result of this, a narrow inner passage 56 is formed within the inner pipe 52 and, at the same time, a narrow annular outer passage 58 is formed between the inner pipe 52 and the outer pipe 54. An outlet 52A of the inner pipe 52 is slightly recessed from an outlet 54A of the outer pipe 54 and a mixing field 60 is formed in a space formed thereby. A first supply pipe 62 is connected to an inlet port 56A of the inner passage 56 and a second supply pipe 64 is connected to an inlet port 58A of the annular outer passage 58.

A jacket 51 is wound around the outer circumference of the outer pipe 54 and, in the same manner as described in FIG. 1, the mixing and reaction temperature of the solutions L1 and L2 in the mixing field 60 is controlled. Also in this case, it is possible to provide a temperature regulator in an regulating tank which regulates the solutions L1 and L2, which is not shown in the figure. In FIG. 11, the reference numeral 51A denotes a heating medium inlet of the jacket 51 and the reference numeral 51B denotes a heating medium outlet.

The solution L1 is introduced from the first supply pipe 62 and the solution L2 is supplied from the second supply pipe

64 and, at the same time, it is ensured that the solutions L1 and L2 are supplied as turbulent flows having a Reynolds number of not less than 10000 during the flow into the mixing field 60. As a result of this, because in the mixing field 60 the solutions L1 and L2 form turbulent flow interfaces in the travel direction, the solutions L1 and L2 are instantaneously and efficiently mixed together and caused to react with each other under appropriate mixing and reaction temperature conditions and the mixed reaction solution LM containing alloy particles is formed. The mixed reaction solution LM is immediately discharged from an outlet 66 of the mixing field 60. Incidentally, the supply pipes of the solutions L1 and L2 may be reversed. As a result, it is possible to form an alloy particle which has a particle size in the range of 1 to 100 nm and a coefficient of variation in the particle size of not more than 15% and is excellent in the self-assembling property.

In this case, the static mixing device 50 for carrying out the parallel flow mixing method is not limited to the double cylindrical pipe structure and, for example, in a case where a plurality of aqueous metallic salt solutions as with the solution L3 are mixed with the solution L1, it is advisable to adopt a multiple cylindrical pipe structure of a number of pipes equal to the number of solutions.

Figure 12:
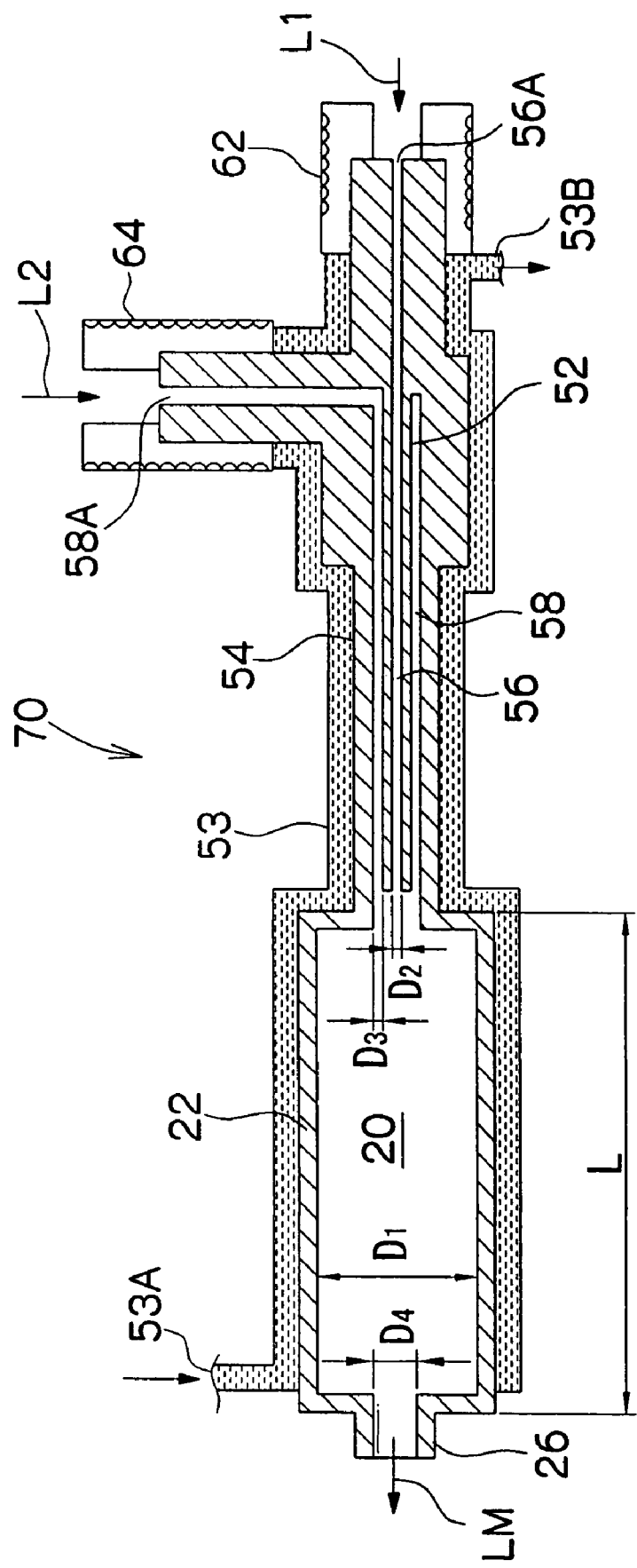
FIG. 12 is a conceptual diagram showing the construction of a mode of a static mixing device for carrying out the parallel flow mixing method in which the concept of eddy viscosity is considered in the alloy particle preparation step in the method of manufacturing a magnetic particle of the present invention.
Figure 13:
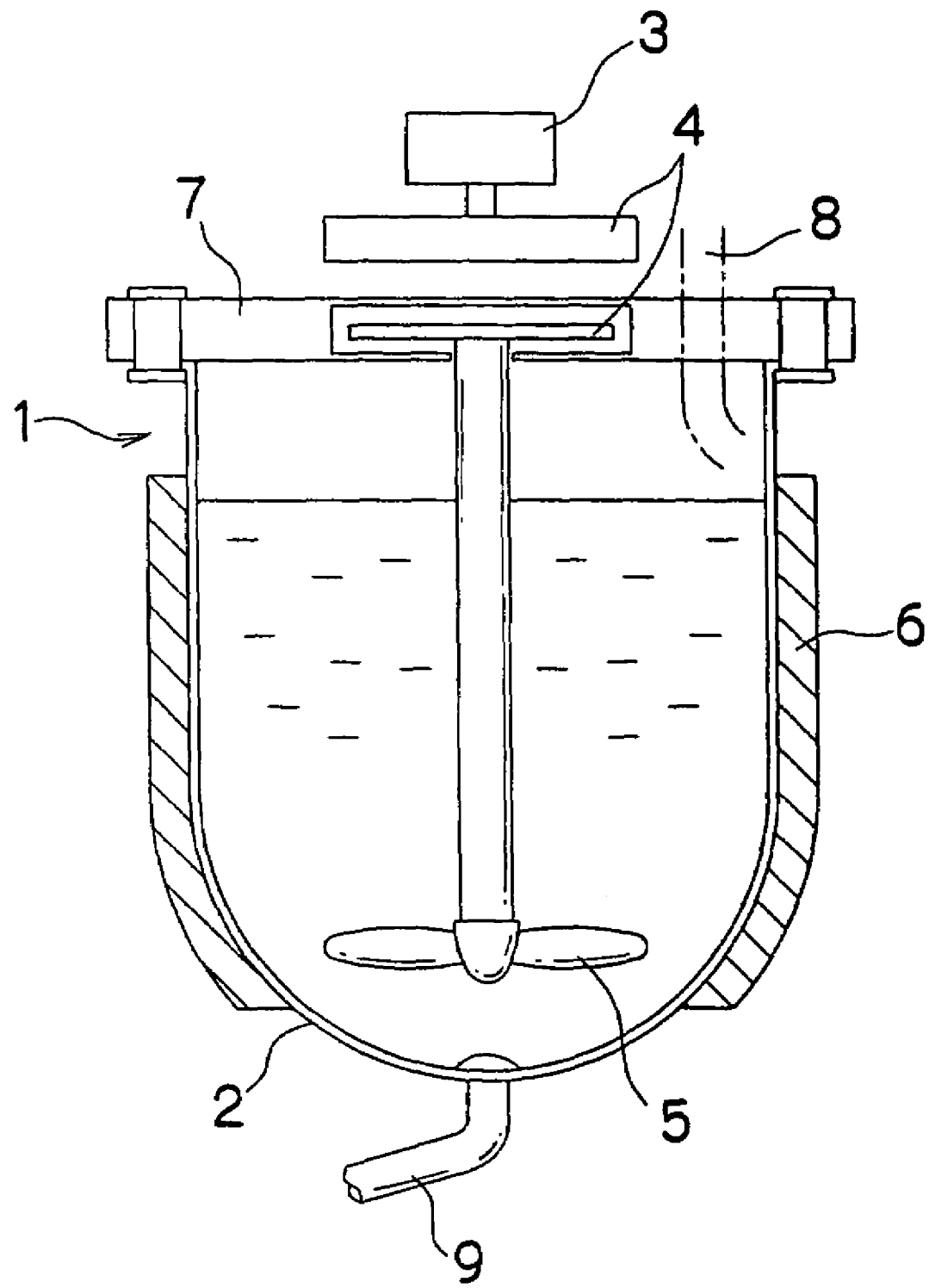
FIG. 13 is an explanatory diagram to explain the construction of a conventional mixing and reaction device.

FIG. 12 shows a mixing method obtained by adding the concept of the eddy viscosity of FIGS. 1 and 2 to the parallel flow mixing method. One of the solutions L1 and L2 is spouted from the inner pipe 52 into the mixing field in a string-like spout flow shape having a Reynolds number of not less than 10000 and the other solution is spouted from the outer pipe 54 into the mixing field in a string-like spout flow shape having a Reynolds number of not less than 10000, the mixing chamber (mixing field) having a diameter larger than the diameter of the nozzles spouting these solutions. By using the eddy viscosity generated in the two solutions, the two solutions are mixed together and caused to reach with each other and the mixed reaction solution LM is discharged from the discharge pipe 26 having a smaller diameter than the diameter of the mixing field. Incidentally, the same members as in FIG. 11 are given like reference numerals and their descriptions are omitted and the same members as in FIG. 1 are given like reference numerals and described.

In a static mixing device 70 of FIG. 12, the leading end of the outer pipe 54 shown in FIG. 11 is provided, in a connected row arrangement, with the cylindrical mixing chamber 20 (mixing field) having a larger diameter than the diameter of the outer pipe 54 and the leading end of the mixing chamber 20 is provided with the discharge pipe 26 having a smaller diameter than the diameter of the mixing chamber 20. A jacket 53 is wound around the outer circumference of the outer pipe 54 and the mixing chamber 20 and, in the same manner as described in FIG. 1, the mixing and reaction temperature of the solutions L1 and L2 in the outer pipe 54 and the mixer 22 is controlled. Also in this case, it is possible to provide a temperature regulator in an regulating tank which regulates the solutions L1 and L2, which is not shown in the figure. In FIG. 12, the reference numeral 53A denotes a heating medium inlet of the jacket 53 and the reference numeral 53B denotes a heating medium outlet.

The solution L1 is introduced from the first supply pipe 62 and the solution L2 is introduced from the second supply pipe 64 and, at the same time, it is ensured that the solutions L1 and L2 are supplied as turbulent flows having a Reynolds number of not less than 10000 during the flow into the mixing field 60. As a result of this, the solution L1 spouted into the mixing chamber 20 in string-like shape moves while forming an eddy viscosity which expands from the inside to the outside, whereas the solution L2 spouted in annular shape travels while forming an annular eddy viscosity which expands from the outside to the inside, with the result that the eddy viscosities overlap each other. Incidentally, the supply pipes of the solutions L1 and L2 may be reversed.

Therefore, the solutions L1 and L2 are instantaneously and efficiently mixed together and caused to react with each other under appropriate mixing and reaction temperature conditions and the mixed reaction solution containing alloy particles is formed. The mixed reaction solution LM is immediately discharged from the discharge pipe 26. As a result, it is possible to form an alloy particle which has a particle size in the range of 1 to 100 nm and a coefficient of variation in the particle size of not more than 15% and is excellent in the self-assembling property.

In this manner, one solution is spouted into the mixing chamber 20 in annular form and the other solution is spouted in a string-like shape into the center of the annulus, whereby the solutions L1 and L2 are instantaneously and efficiently mixed together and caused to react with each other and the mixed reaction solution containing alloy particles is formed.

The static mixing device 50, 70 for carrying out the parallel flow mixing method is not limited to those of FIGS. 11 and 12 described above. Any static mixing device may be used so long as it ensures that a plurality of kinds of solutions are supplied from a concentric multiple-cylindrical pipe to a mixing field formed at a leading end of the multiple-cylindrical pipe and are mixed together and caused to react with each other and wherein by use of a static mixing device which discharges a mixed reaction solution from the mixing field, the plurality of kinds of solutions are supplied as turbulent flows having a Reynolds number of not less than 10000 during the flow into the mixing field.

By mixing the solutions L1 and L2 by use of the static mixing device for carrying out the above-described [1] one jet mixing method, [2] T-shaped and Y-shaped mixing methods and [3] parallel flow mixing method, it is possible to prepare an alloy particle which meets all of the requirements for a micro size, monodispersibility and transformation facilitativeness is prepared in the alloy particle preparation step.

It is preferred that the mixing and reaction temperature of the reduction reaction by the above-described mixing be a constant temperature in the range of −5° C. to 30° C. If the mixing and reaction temperature is less than −5° C., this poses the problem that a water phase condenses, making the reduction reaction nonuniform. If the mixing and reaction temperature exceeds 30° C., coalescence and precipitation tend to occur and the system may sometimes become unstable. The reduction temperature is preferably in the range of 0° C. to 25° C. and more preferably in the range of 5° C. to 25° C. "A constant temperature" here device that when a set temperature is T (° C.), this T is in the range of T ±3° C. Incidentally, also in this case, the upper limit and lower limit to this T are the above-described −5° C. to 30° C. The reduction reaction time, which must be appropriately selected according to the reversed micelle capacity etc., is preferably 1 to 30 minutes and more preferably 5 to 20 minutes.

In the above-described reduction step, it is preferred that to at lest either of the solutions L1 and L2, at least one kind of dispersant which contains 1 to 3 amino groups or carboxyl groups be added in an amount of 0.001 to 10 moles per mole of alloy particle to be prepared. By adding such a dispersant, it is possible to obtain an alloy particle which is more monodispersible and free from coalescence. When the amount of added dispersant is less than 0.001 mole, it may be sometimes impossible to further improve the monodispersibility of an alloy particle. When the amount of added dispersant exceeds 10 mole, coalescence may sometimes occur.

An organic compound having a group which is adsorbed on the surface of an alloy particle is desirable as a dispersant. Concretely, dispersants which have 1 to 3 amino groups, carboxyl groups, sulfonate groups or sulfinate groups are preferred and these may be used singly or in combination.

These compounds have the following structural formulas: R—$NH_2$, $NH_2$—R—$NH_2$, $NH_2$—R($NH_2$)—$NH_2$, R—COOH, COOH—R—COOH, COOH—R(COOH)—COOH, R—$SO_3H$, $SO_3H$—R—$SO_3H$, $SO_3H$—R($SO_3H$)—$SO_3H$, R—$SO_2H$, $SO_2H$—R—$SO_2H$, $SO_2H$—R ($SO_2H$)—$SO_2H$. The R in the formulas each denotes a linear, branched or cyclic saturated or unsaturated hydrocarbon.

A specially desirable compound as a dispersant is oleic acid. Oleic acid, which is a surfactant which is widely known in the stabilization of colloids, has been used in protecting metallic particles of iron etc. The relatively long chain of oleic acid provides a cubic obstacle important for counteracting the strong magnetic interaction between particles (for example, oleic acid has 18 carbon chains and its length is up to 20 angstroms (up to 2 nm). Oleic acid is not a fatty acid and has one double bond).

As with oleic acid, similar long-chain carboxylic acids, such as aerucic acid and linoleic acid, are also used (for example, long-chain organic acids having 8 to 20 carbon atoms can be used singly or in combination). Oleic acid (for example, olive oil) is desirable because it is an inexpensive natural resource capable of being easily obtained. Furthermore, oleylamine derived from oleic acid is also a dispersant which is as useful as oleic acid.

It might be thought that in the reduction step as described above, metals which are base in terms of redox potentials (metals of not more than –0.2 V (vs. NHE) or so), such as Co, Fe, Ni and Cr, are reduced in a CuAu type or $Cu_3Au$ type hard magnetic ordered alloy phase and precipitate in a state of micro size and monodispersion. It might be thought that after that, in the temperature rise step and the aging step which will be described later, with the precipitated base metals serving as nuclei, metals which are noble in terms of redox potentials (metals of not less than –0.2 V (vs. NHE) or so), such as Pt, Pd and Rh, are reduced on the surface, displaced and precipitate by the base metal. It might be thought that the ionized base metals are reduced again by a reductant and precipitate. An alloy particle capable of forming CuAu type or $Cu_3Au$ type hard magnetic ordered alloy is obtained by repetitions of such reactions.

Next, a description will be given of the aging step which raises, after the completion of the reduction step, the mixing and reaction solution to an aging temperature higher than the mixing and reaction temperature of –5° C. to 30° C. in the reduction step as described above.

(Aging Step)

It is preferred that the aging temperature be a constant temperature in the range of 30 to 90° C. and, this temperature should be higher than the temperature of reduction reaction. It is preferred that the aging time be 5 to 180 minutes. If the aging temperature and aging time shift to the high temperature and long time side from above range, coalescence or precipitation is apt to occur. Conversely, if the aging temperature and aging time shift to the low temperature and short time side, the reaction may not sometimes complete, resulting in a change in the composition. The aging temperature and aging time are preferably 40 to 80° C. and 10 to 150 minutes and more preferably 40 to 70° C. and 20 to 120 minutes.

"A constant temperature" here is synonymous with the case of the temperature of reduction reaction (however, in this case, "the reduction temperature" becomes "the aging temperature"). In particular, however, "a constant temperature" is preferably higher than the temperature of reduction reaction by not less than 5° C. within the above-described range of the aging temperature (30 to 90° C.) and more preferably higher than the temperature of reduction reaction by not less than 10° C. In the case of less than 5° C., a prescribed composition may not sometimes be obtained.

In the aging step as described above, noble metals precipitate on the base metals which were reduced and precipitated in the reduction step. That is, because the reduction of noble metals occurs only on base metals and base metals and noble metals dot not separately precipitate, it is possible to prepare an alloy particle capable of efficiently forming a CuAu type or $Cu_3Au$ type hard magnetic ordered alloy at a high yield and according to a prescribed composition and it is possible to control the alloy particle to a desired composition. Furthermore, by appropriately adjusting the temperature and the stirring rate of during aging, it is possible to obtain a desired particle diameter of the obtained alloy particle.

It is desirable to provide the cleaning and dispersion step of cleaning the solution after aging with a mixed solution of water and first class alcohol, then performing precipitation treatment with first class alcohol thereby to generate precipitates, and dispersing the precipitates with an organic solvent.

Impurities are removed by providing this cleaning and dispersion step and it becomes possible to further improve applicability when the magnetic layer of a magnetic recording medium is formed by application. Cleaning and dispersion are each performed at least once and preferably each twice or more.

Although first class alcohol used in cleaning is not especially limited, methanol, ethanol, etc. are desirable. The volume mixing ratio (water/first class alcohol) is preferably in the range of 10/1 to 2/1 and more preferably in the range of 5/1 to 3/1. If the ratio of water is high, the surfactant may not sometimes be easily removed. Conversely, if the ratio of first class alcohol is high, coalescence may sometimes occur. Alloy particles dispersed in a solution (an alloy-particle-containing solution) are obtained in a manner as described above.

The alloy articles are monodispersed. Therefore, even when the alloy articles are applied to a backing, these particles do not coalesce together and can be kept in a uniformly dispersed state. Therefore, even when annealing treatment is performed, the respective alloy particles do not coalesce together and hence it is possible to ensure efficient hard magnetizing, resulting in excellent applicability. Furthermore, the alloy particle is excellent in the self-assembling property because it is prepared by the above-described high-pressure mixing methods, and annealing treatment enables the alloy particle to undergo transformation from an unordered phase to an ordered phase easily and positively. This permits efficient hard magnetizing.

From the standpoint of lowering the noise level, it is desirable that the particle size of an alloy particle before oxidation treatment, which will be described later, be small. However, if the particle size is too small, supermagnetism occurs after annealing and the particle may sometimes become unsuitable for magnetic recording. In general, the particle size is preferably in the range of 1 to 100 nm, more preferably in the range of 3 to 20 nm, and most preferably in the range of 3 to 10 nm.

(Reduction Process)

A general reduction process for preparing alloy particles is described here.

Although there are various methods of preparing an alloy particle capable of forming a CuAu type or $Cu_3Au$ type hard magnetic ordered alloy in the reduction process, it is desirable to apply a method of reducing at least a metal which is base in terms of redox potential (hereinafter may sometimes be referred to simply as "a base metal") and a metal which is noble in terms of redox potential (hereinafter may sometimes be referred to simply as "a noble metal") by use of a reductant etc. in an organic solvent or water or a mixed solution of an organic solvent and water. The order of reduction of the base metal and noble metal is not especially limited and the base metal and noble metal may be simultaneously reduced.

Alcohols, polyalcohols, etc. can be used as the above-described organic agent. Methanol, ethanol, butanol, etc. can be enumerated as alcohols and ethylene glycerin, glycerol, etc. can be enumerated as polyalcohols.

Incidentally, examples of a CuAu type or $Cu_3Au$ type ferromagnetic ordered alloy are the same as in the case of the above-described reversed micelle process.

The methods described in the paragraphs 18 to 30 etc. of the Japanese Patent Application No. 2001-269255 can be applied as a method of preparing an alloy particle by precipitating a noble metal beforehand.

Pt, Pd, Rh, etc. can be advantageously used as metals which are noble in terms of redox potential and $H_2 PtCl_6.6H_2O$, Pt $(CH_3 COCHCOCH_3)_2$, $RhCl_3.3H_2O$, Pd $(OCOCH_3)_2$, $PdCl_2$, Pd $(CH_3 COCHCOCH_3)_2$, etc. can be used by being dissolving in a solvent. The concentration of a metal in the solution is preferably in the range of 0.1 to 1000 μmol/ml and more preferably in the range of 0.1 to 100 μmol/ml.

Co, Fe, Ni and Cr can be favorably used as metals which are base in terms of redox potential and Fe and Co are especially preferably used. Au such metals, $FeSO_4.7H_2O$, $NiSO_4.7H_2O$, $CoCl_2.6H_2O$, Co $(OCOCH_3)_2.4H_2O$, etc. can be used by being dissolved in a solvent. The concentration of a metal in the solution is preferably in the range of 0.1 to 1000 μmol/ml and more preferably in the range of 0.1 to 100 μmol/ml.

As with the above-described reversed micelle process, it is desirable to lower the temperature of transformation to a hard magnetic ordered alloy by adding a third element to a binary alloy. The amount of an added metal is the same as with the reversed micelle process.

For example, in a case where a base metal and a noble metal are reduced in this order and caused to precipitate, it is desirable to first reduce the base metal or the base metal and part of the noble metal by use of a reductant having a more base reduction potential than –0.2 V (vs. NHE), add the reduced metals to the source of the noble metal, then perform reduction by use of a reductant which is nobler in terms of redox potential than –0.2 V (vs. NHE) and perform reduction by use of a reductant having a reduction potential which is more base than –0.2 V (vs. NHE).

Redox potentials depend on the pH of the system. Alcohols, such as 1,2-hexadecandiol, glycerins, $H_2$ and HCHO are advantageously used as reductants which are nobler than –0.2 V (vs. NHE).

As reductants which are more base than –0.2 V (vs. NHE), $S_2O_6^{2-}$, $H_2PO_{2-}$, $BH_{4-}$, $N_2H_{5+}$, $H_2PO_{3-}$ can be advantageously used.

Incidentally, when a zero-valent metallic compound, such as Fe carbonyl, is used as the material for a base metal, it is unnecessary to use a reductant for the base metal By causing an adsorbent to be present during the reduction and precipitation of a noble metal, it is possible to prepare an alloy particle in a stable manner. It is desirable to use a polymer and a surfactant as an adsorbent.

Polyvinyl alcohol (PVA), poly-N-vinyl-2-pyrrolidone (PVP), gelatin, etc. can be enumerated as the above-described polymer. Among others, PVP is particularly preferable.

The molecular weight is preferably in the range of 20000 to 60000 and more preferably in the range of 30000 to 50000. The quantity of a polymer is preferably in the range of 0.1 to 10 times the mass of a generated alloy particle and more preferably in the range of 0.1 to 5 times.

It is preferred that a surfactant which is advantageously used as an adsorbent contain "an organic stabilizer" which is a long-chain organic compound expressed by the general formula R—X. The R in the above general formula denotes "a tail group" which is a straight-chain or branched hydrocarbon or fluorocarbon chain and usually contains 8 to 22 carbon atoms. The X in the above general equation denotes "a head group" which is a portion (X) that supplies a specific chemical bond to the alloy particle surface, and it is preferred that X be any one of sulfinate (—SOOH), sulfonate (—$SO_2OH$), phosfinate (—POOH), phosfonate (—OPO$(OH)_2$), carboxylate and thiol.

It is preferred that the above-described organic stabilizer be any one of sulfonic acid (R—$SO_2OH$), sulfinic acid (R—SOOH), phosphinic acid ($R_2POOH$), phosphonic acid (R—OPO$(OH)_2$), carboxylic acid (R—COOH), thiol (R—SH), etc. As with the reversed micelle process, however, the use of oleic acid is especially preferred than any other above-enumerated substances.

Combinations of the above-described phosphine and an organic stabilizer (triorganophosphine/acid etc.) can provide excellent controllability for the growth and stabilization of particles. Although didecyl ether and didodecyl ether can also be used, phenyl ether or n-octyl ether is advantageously used as a solvent for its low cost and high boiling point.

However, a general reduction process for preparing alloy particles is performed at high temperatures compared to the mixing and reaction temperature in the range of –5° C. to 30° C. in the mixing and reaction using the high-pressure mixing methods as in the present invention. That is, it is general practice to cause the reaction to occur at a temperature in the range of 80° C. to 360° C. owing to necessary alloy particles and the boiling temperature of a solvent and the temperature range of 80° C. to 240° C. is more preferred. In the case of a general reduction process, particles may sometimes not grow when the reaction temperature is lower than this temperature range. On the other hand, if the temperature is higher than this range, particles grow without being controlled and the generation of undesirable by-products may sometimes increase.

As with the reversed micelle process, the particle diameter of an alloy particle is preferably in the range of 1 to 100 nm, more preferably in the range of 3 to 20 nm, and further more preferably in the range of 3 to 10 nm, in the same manner as in the present invention.

The seed crystal process is effective as a method of increasing the particle size (particle diameter). In order to use alloy particles as a magnetic recording medium, filling alloy particles at fine densities is preferable for lowering the noise level and increasing the recording capacity and, for this purpose, the standard deviation of an alloy particle size is preferably below 10% and more preferably not more than 5%. In the present invention, the size of an alloy particle is specified by the coefficient of variation, and the coefficient of variation is not more than 15% and preferably not more than 10%.

If the particle size is too small, superparamagnetism occurs and this is undesirable. Therefore, in order to increase the particle size, it is desirable to adopt the seed crystal process as described above. On this occasion, there is a case where a metal which is nobler than the metal which constitutes particles is caused to precipitate. Because the oxidation of particles is feared in this case, it is desirable that the particles be subjected to hydrogenation treatment beforehand.

Although it is desirable that the outermost layer of an alloy particle be constituted by a noble metal from the standpoint of the prevention of oxidation, such a noble metal is apt to coalesce and hence in the present invention, it is desirable that the outermost layer of an alloy particle be constituted by an alloy of a noble metal and a base metal. According to the liquid phase process as described above, such a constitution can be easily and efficiently realized.

Removing salts from the solution after the preparation of alloy particles is desirable from the standpoint of improving the dispersion stability of alloy particles. In removing salts, there is a method by which alcohol is excessively added thereby to cause slight coalescence and the salts are removed together with a supernatant by causing natural sedimentation or centrifugal sedimentation. Because coalescence is apt to occur in this method, it is desirable to adopt the ultrafiltration method.

Alloy particles dispersed in a solution (an alloy-particle-containing solution) can be obtained as described above.

A transmission electron microscope (TEM) can be used in evaluating the particle size of an alloy particle. Although electron diffraction by a TEM may be used in determining the crystal system of an alloy particle or a magnetic particle, the use of X-ray diffraction is desirable because of high accuracy. In the composition analysis of the interior of an alloy particle or a magnetic particle, it is desirable to perform an evaluation by adding EDAX to FE-TEM capable of reducing the section of electron beams. Furthermore, the evaluation of the magnetic properties of an alloy particle or a magnetic particle can be performed by use of VSM.

[Oxidation Treatment Step]

By subjecting a prepared alloy particle to oxidation treatment, it is possible to efficiently manufacture a magnetic particle having hard magnetism without raising the temperature during annealing treatment, which is performed later in a nonoxidizing atmosphere. It might be thought that this is due to the phenomenon which will be described below.

That is, first, by oxidizing an alloy particle, oxygen enters the crystal lattice of the alloy particle. When annealing treatment is performed, with oxygen in the crystal lattice, the oxygen is released from the crystal lattice due to heat. The liberation of the oxygen causes a defect. Because the migration of metallic atoms constituting the alloy becomes easy through this defect, phase transformation becomes apt occur even at a relatively low temperature. Therefore, by subjecting an alloy particle having a good self-assembling property prepared by the above-described high-pressure mixing method to oxidation treatment, it becomes more easy to lower the temperature of annealing treatment.

This phenomenon can be supposed, for example, by measuring the EXAFS (extended X-ray absorption fine structure) of an alloy particle after oxidation treatment and an annealed magnetic particle.

For example, in an Fe—Pt alloy particle not subjected to oxidation treatment, the presence of an Fe atom and the bond between a Pt atom and an Fe atom can be recognized.

In contrast to this, in an alloy particle subjected to oxidation treatment, the presence of the bond between an Fe atom and an oxygen atom can be recognized. However, the bond between a Pt atom and an Fe atom is scarcely seen. This device that the Fe—Pt bond and the Fe—Fe bond have been cut by oxygen atoms. It might be thought that this is the reason why a Pt atom and an Fe atom can migrate easily during annealing.

And after this alloy particle is subjected to annealing treatment, the presence of oxygen cannot be recognized and the presence of the bond to a Pt atom or an Fe atom can be recognized around an Fe atom.

In view of the above phenomenon, it will be understood that phase transformation does not proceed easily unless oxidation is performed and that it becomes necessary to raise the temperature of annealing treatment. However, it might also be though that if excessive oxidation is performed, the interaction between a metal which is easily oxidized, such as Fe, and oxygen becomes too strong, with the result that a metal oxide is formed.

Therefore, it becomes important to control the oxidation state of an alloy particle and for this purpose, it is necessary to set optimum oxidation treatment conditions.

In oxidation treatment, for example, in a case where alloy particles are prepared by the above-described liquid phase process, it is necessary only that a gas containing at least oxygen be supplied to an alloy-particle-containing solution after the preparation of the alloy particles.

The partial pressure of oxygen in this case is preferably in the range of 10 to 100% of the total pressure and more preferably in the range of 15 to 50%. The temperature of oxidation treatment is preferably in the range of 0 to 100° C. and more preferably in the range of 15 to 80° C.

It is preferred that the oxidation state of alloy particles be evaluated by EXAFS etc. and in consideration of that an Fe—Fe bond and a Pi—Fe bond are cut by oxygen, the number of bonds between base metals such as Fe and oxygen is preferably in the range of 0.5 to 4 and more preferably in the range of 1 to 3.

[Annealing Treatment Step]

An alloy particle subjected to oxidation treatment forms an unordered phase. As described above, hard magnetism cannot be obtained from an unordered phase. In order to form an ordered phase, therefore, it is necessary to perform heat treatment (annealing). In this heat treatment, it is necessary to use differential thermal analysis (DTA) to determine the transformation temperature at which the alloys constituting an alloy particle undergoes transformation between an ordered phase and an unordered phase and perform the heat treatment at a temperature of not less than this temperature.

Although the above-described transformation temperature is usually about 500° C., it is possible to use a temperature below the usual temperature, because the self-assembling property of the prepared alloy particle is improved by the mixing by the high-pressure mixing methods in the above-described reduction step. Therefore, the temperature of annealing treatment is preferably not less than 100° C. and more preferably in the range of 100 to 500° C. Furthermore, the temperature may sometimes be fallen by the addition of a third element.

When annealing treatment is performed in the state of a particle, the migration of particles is apt to occur and coalescence is apt to occur. For this reason, although a high coercive force is obtained, this tends to pose the problem that the particle size increases. From the standpoint of the prevention of the coalescence of alloy particles, it is preferred that alloy particles applied to a backing etc. be subjected to annealing treatment.

Furthermore, by annealing alloy particles on a backing to form magnetic particles, it is possible to use a layer constituted by such magnetic particles to be a magnetic layer as a magnetic recording medium.

Any backing, whether it is made of an inorganic substance or an organic substance, may be used so long as it is a backing used in a magnetic recording medium.

As the backings of an inorganic substance, Al, Mg-containing alloys such as Al—Mg and Mg—Al-LMn, glass, quartz, carbon, silicon, ceramics, etc. are used. These backings are excellent in impact resistance and has rigidity suitable for thin thickness design and high speed rotation. These backings have the characteristic that of high heat resistance as organic substance.

As the backings of an organic substance, polyesters such as polyethylene telephthalate and polyethylene naphthalate, polyolefins, cellulose triacetate, polycarnonate, polyamids (including fatty polyamide and aromatic polyamides such as aramide), polyimide, polyamide-imide, polysulfone, polybenzooxazole, etc. can be used.

In applying alloy particles to a backing, it is necessary only that various additives be added to the above-described alloy-particle-containing solution subjected to oxidation treatment as required and then alloy particles be applied to the backing.

It is desirable that the content of alloy particles in this case be a required concentration (0.01 to 0.1 mg/ml).

Air doctor coating, blade coating, rod coating, extrusion coating, air knife coating, squeeze coating, impregnation coating, reverse roll coating, transfer roll coating, offset gravure coating, kiss coating, cast coating, spray coating, spin coating, etc. can be used as methods of application to a backing.

As an atmosphere during annealing treatment, a nonoxidizing atmosphere of $H_2$, $N_2$, Ar, He, Ne, etc. should be used in order to ensure that phase transformation proceeds efficiently thereby to prevent the oxidation of alloys.

Particularly, from the standpoint of causing the oxygen to remove present on lattices by oxidation treatment, it is desirable to use a reducing atmosphere of methane, ethane, $H_2$, etc. Furthermore, from the standpoint of keeping the particle diameter, it is desirable to perform annealing treatment in a magnetic field in a reducing atmosphere. Incidentally, when an $H_2$ atmosphere is used, it is desirable that an inert gas be mixed from the standpoint of explosion protection.

In order to prevent the coalescence of particles during annealing, it is desirable first to perform annealing treatment at a temperature of not more than the transformation temperature in an inert gas thereby carbonize a dispersant and then to perform annealing treatment at a temperature of not less than the transformation temperature in a reducing atmosphere. At this time, the most desirable mode is first to perform the above-described annealing treatment at a temperature of not more than the transformation temperature as required, then to apply an Si-base resin etc. to a layer constituted by alloy particles, and lastly to perform annealing treatment at a temperature of not less than the transformation temperature.

By performing annealing treatment as described above, it is ensured that alloy particles undergo phase transformation from an unordered phase to an ordered phase and magnetic particles having hard magnetism can be obtained.

The coercive force of a magnetic particle manufactured by the above-described method of manufacturing a magnetic particle according to the present invention is preferably in the range of 95.5 to 955 kA/m (1200 to 12000 Oe). In consideration of that when this magnetic particle is applied to a magnetic recording medium, so that a recording head can be compatible with the magnetic recording medium, this coercive force is more preferably in the range of 95.5 to 398 kA/m (1200 to 5000 Oe).

The particle size of the magnetic particle is preferably in the range of 1 to 100 nm, more preferably in the range of 3 to 20 nm, and most preferably in the range of 3 to 10 nm.

<<Magnetic Recording Medium>>

A magnetic recording medium of the present invention contains magnetic particles in its magnetic layer and the magnetic particles are those manufactured by the above-described method of manufacturing a magnetic particle of the present invention.

As the magnetic recording medium, magnetic tapes such as a video tape and a computer tape, magnetic disks such as a floppy(R) disk and a hard disk, etc. can be enumerated. As described above, in a case where alloy particles (an alloy-particle-containing solution) are applied to a backing and changed to magnetic particles by performing annealing treatment, this layer constituted by magnetic particles can be used as a magnetic layer. Furthermore, in a case where alloy particles on a backing are not subjected to annealing treatment and instead magnetic particles are formed by performing annealing treatment in the state of a particle, the magnetic particles are kneaded by use of an open kneader, a three-roll mill, etc. and then finely dispersed by use of a sand grinder etc. thereby prepare an application solution, and this solution is applied to a backing by a publicly known method to form a magnetic layer.

The thickness of a prepared magnetic layer, which depends on the types of magnetic recording media to be applied, is preferably in the range of 4 nm to 1 μm and more preferably in the range of 4 nm to 100 nm.

A magnetic recording medium of the present invention may contain other layers as required in addition to the magnetic layer. For example, in the case of a disk, it is desirable to provide a further magnetic layer and a nonmagnetic layer on the surface on the side opposite to the magnetic layer. In the case of a tape, it is desirable to provide a back layer on the surface of an insoluble backing on the side opposite to the magnetic layer.

Furthermore, by forming a very thin protective film on the magnetic layer thereby to improve wear resistance and in addition, by applying a lubricant to this protective film thereby to improve slip properties, it is possible to obtain a magnetic recoding medium having sufficient reliability.

As the materials for the protective film, it is possible to enumerate oxides such as silica, alumina, titania, zirconia, cobalt oxide and nickel oxide, nitrides such as titanium nitride, silicon nitride and boron nitride, carbides such as silicon carbide, chromium carbide and boron carbide, carbons such as graphite and amorphous carbide, etc. However, hard amorphous carbon generally called diamond-like carbon is especially desirable.

A protective carbon film constituted by carbon, which is a very thin film having sufficient wear resistance and does not easily cause sticking to sliding members, is suitable as a material for the protective film.

In hard disks, it is general practice to adopt the sputtering method as a method of forming a protective carbon film. In products which require continuous film forming as with a video tape, however, many methods by which plasma CVD having a higher film forming speed is used have been proposed. Therefore, it is desirable to apply these methods.

It has been reported that in the plasma injection CVD (PI-CVD) method among others, the film forming speed is very high and that a good protective carbon film which is hard and has few pinholes is obtained (for example, in the Japanese Patent Application Publication No. 61-130487, the Japanese Patent Application Publication No. 63-279426 and the Japanese Patent Application Publication No. 3-113824).

The Vickers hardness of this protective carbon film is preferably not less than 1000 kg/mm$^2$ and more preferably not less than 2000 kg/mm$^2$. It is preferred that the crystal structure of this protective carbon film be an amorphous structure and that the protective carbon film be electrically nonconductive.

In a case where a diamond-like carbon film is used as a protective carbon film, this structure can be confirmed by a Raman scattering spectroscopic analysis. That is, when a diamond-like carbon film is measured, this structure can be confirmed by that a peak is detected in the range of 1520 to 1560 cm$^{-1}$. When the structure of a carbon film deviates from a diamond-like structure, the peak detected by a Raman scattering spectroscopic analysis deviates from the above range and, at the same time, the hardness as a protective film also decreases.

As the carbon materials for forming this protective carbon film, it is desirable to use carbon-containing compounds, including alkanes such as methane, ethane, propane and butane, alkenes such as ethylene and propylene, and alkynes such as acetylene. Furthermore, a carrier gas such as argon and an additive gas for improving the film quality, such as hydrogen and nitrogen, can be added as required.

If the film thickness of the protective carbon film is too thick, this results in the worsening of the electromagnetic transducing performance and a decrease in the adhesion to a magnetic layer. If this film thickness is too thin, the anti-grindability becomes insufficient. Therefore, the film thickness is preferably in the range of 2.5 to 20 nm and more preferably in the range of 5 to 10 nm.

Furthermore, in order to improve the adhesion of this protective film to the magnetic layer, which provides a substrate, it is desirable to improve the surface quality by etching the surface of the magnetic layer beforehand by using an inert gas or by exposing the surface to reactive gas plasmas of oxygen etc.

In order to improve the electromagnetic transducing performance, the magnetic layer may be of a multi-layered structure or have a publicly known nonmagnetic substrate layer or intermediate layer under the magnetic layer. In order to improve the travel endurance and corrosion resistance, it is desirable to apply a lubricant or a rust preventive agent to the above-described magnetic layer or protective film as described above. As a lubricant to be added, it is possible to use publicly known hydrocarbon-base lubricants, fluorine-base lubricants, extreme-pressure additives, etc.

As the hydrocarbon-base lubricants, it is possible to enumerate carboxylic acids such as stearic acid and oleic acid, esters such as butyl stearate, sulfonates such as octadecyl sulfonate, phosphate esters such as monooctadecyl phosphate, alcohols such as stearyl alcohol and oleyl alcohol, amides carboxylate such as amide stearate, amines such as stearylamine, etc.

As the fluorine-base lubricants, it is possible to enumerate lubricants in which part or all of the alkyl groups of the above-described hydrocarbon-base lubricants are substituted with fluoroalkyl bases or perfluoro polyether bases.

The perfluoro polyether bases are a perfluoro methlene oxide polymer, a perfluoro ethylene oxide polymer, a perfluoro-n-prolylene oxide polymer $(CF_2\ CF_2\ CF_2O)_n$, a perfluoro isopropylene oxide polymer $(CF\ (CF_3)\ CF_2O)_n$ or copolymers of these polymers Furthermore, compounds in which polar functional groups, such as a hydroxyl group, an ester group and a carboxyl group, are present in the terminal or molecules of the alkyl groups of a hydrocarbon-base lubricant, are effective in reducing the frictional force and hence suitable.

The molecular weight of these substances is in the range of 500 to 5000 and preferably in the range of 1000 to 3000.

When the molecular weight is less than 500, the volatility may sometimes be high and the lubricity may sometimes be low. When the molecular weight exceeds 5000, the viscosity increases and a slider is apt to be adsorbed by a disk, with the result that travel stops and head crushes may sometimes become apt to occur.

This perfluoro polyether is commercially available under brand names such as FOMBLIN of Aujimond and KRYTOX of DuPont.

As the extreme-pressure additives, it is possible to enumerate esters phosphate such as trilauryl phosphate, esters phosphite such as trilauryl phosphite, esters trithiophosphite such as trilauryl trithiophosphite and esters thiophosphate, sulfur-base extreme-pressure agents such as dibenzyl disulfide, etc.

The above-described lubricants are used singly or in combination. In applying these lubricants to the magnetic layer or the protective film, the lubricants are solved in an organic solvent and applied by the wire bar method, the gravure coating method, the spin coating method, the dip coating method, etc. or the lubricants are caused to adhere by the vacuum evaporation method.

As the rust preventive agents, it is possible to enumerate nitrogen-containing heterocycles, such as benzotriazole, benzoimidazole, purine and pyrimidine, derivatives obtained by introducing alkyl side chains etc. into the mother nuclei of these heterocycles, nitrogen- and sulfur-containing heterocycles, such as benzothiazole, 2-mercaptonbenzothiazole, tetrazainden cyclic compounds and thiouracil compounds, and derivatives of these heterocycles.

As described above, when the magnetic recording medium is a magnetic tape etc., a back coat layer (a backing layer) may be provided on the surface of the nonmagnetic backing where the magnetic layer is not formed. The back coat layer is a layer which is provided by applying a paint for forming a back coat layer, which is obtained by dispersing granular components, such as an abrasive material and an antistatic agent, and a binder in a publicly known organic solvent, to the surface of the nonmagnetic backing where the magnetic layer is not formed.

As the granular components, it is possible to use various kinds of inorganic pigments and carbon black. As the binders, resins such as cellulose nitrate, phenoxy resin, vinyl chloride resin and polyurethane can be used singly or in combination.

Furthermore, a publicly known adhesive layer may be provided on the surface to which the alloy-particle-containing solution is applied and the surface on which the back coat is formed.

When the cut-off value is 0.25 mm, the centerline average roughness of the surface of a magnetic recording medium thus manufactured is preferably in the range of 0.1 to 5 nm and more preferably in the range of 1 to 4 nm. This is because providing a surface having an excellent smoothness is desirable for a magnetic recording medium for high-density recording.

As a method of obtaining such a surface, it is possible to mention a method which involves performing calendaring treatment after the formation of the magnetic layer. Also, burnishing treatment may be performed.

A magnetic recording medium thus obtained can be appropriately punched by use of a punching machine or cut to a desired size by use of a cutting machine so that it can be used.

What is claimed is:

1. A method of manufacturing a magnetic particle, comprising:
   the alloy particle preparation step of preparing an alloy particle capable of forming a CuAu type or $Cu_3Au$ type hard magnetic ordered alloy phase and the magnetic particle formation step;
wherein in said alloy particle preparation step, a plurality of kinds of solutions for preparing said alloy particle are mixed together and caused to react with each other in a mixing field by a liquid phase process and at least one of said plurality of kinds of solutions is mixed by a high-pressure mixing method which involves supplying the solution to the mixing field by a high-pressure jet stream of not less than 1 MPa,
wherein said liquid phase process is a reversed micelle process and the high-pressure mixing method is a one jet mixing process.

2. The method of manufacturing a magnetic particle according to claim 1, wherein the particle size of the alloy particle prepared by said mixing and reaction is 1 to 100 nm and the coefficient of variation in the particle size is not more than 15%.

3. The method of manufacturing a magnetic particle according to claim 1, wherein as said plurality of kinds of solutions, a reversed micelle solution (Solution L1), which is obtained by mixing a nonaqueous organic solvent containing a surfactant and an aqueous reductant solution, and a reversed micelle solution (Solution L2), which is obtained by mixing a nonaqueous organic solvent containing a surfactant and an aqueous metallic salt solution containing a plurality of kinds of metallic atoms constituting said alloy particle, are prepared, and at least one of Solution L1 and Solution L2 is supplied as said high-pressure jet stream of not less than 1 MPa.

4. The method of manufacturing a magnetic particle according to claim 1, wherein as said plurality of kinds of solutions, a reversed micelle solution (Solution L1), which is obtained by mixing a nonaqueous organic solvent containing a surfactant and an aqueous reductant solution, and a reversed micelle solution (Solution L3), which is obtained by mixing a nonaqueous organic solvent containing a surfactant and an aqueous metallic salt solution containing one of a plurality of kinds of metallic atoms constituting said alloy particle, are prepared, the number of prepared Solutions L3 being equal to the number of said plurality of kinds of metallic atoms, and at least one of Solution L1 and the plurality of Solutions L3 is supplied as said high-pressure jet stream of not less than 1 MPa.

5. The method of manufacturing a magnetic particle according to claim 1, wherein in said mixing field, all of said plurality of kinds of solutions are caused to collide with each other in as high-pressure jet streams of not less than 1 MPa.

6. The method of manufacturing a magnetic particle according to claim 1, wherein said plurality of kinds of solutions are turbulent flows having a Reynolds number of not less than 10000 during the flow into the mixing field.

7. The method of manufacturing a magnetic particle according to claim 1, wherein said plurality of kinds of solutions are supplied from a concentric multiple-cylindrical pipe to a mixing field formed at a leading end of the multiple-cylindrical pipe and are mixed together and caused to react with each other and wherein by use of a static mixing device which discharges a mixed reaction solution from said mixing field, said plurality of kinds of solutions are supplied as turbulent flows having a Reynolds number of not less than 10000 during the flow into the mixing field.

8. The method of manufacturing a magnetic particle according to claim 1, wherein said plurality of kinds of solutions are spouted from the respective nozzles to said mixing field having a diameter larger than a bore diameter of the nozzles and are mixed together and caused to react with each other and wherein by use of a static mixing device which discharges a mixed reaction solution from the outlet having a diameter smaller than a diameter of said mixing field, at least one of said plurality of kinds of solutions is supplied to said mixing field as said high-pressure jet stream of not less than 1 MPa and as a turbulent flow having a Reynolds number of not less than 10000 during the flow into said mixing field, and the remaining solutions are added at a lower pressure than said high-pressure jet stream in a position before the eddy viscosity which the high-pressure jet stream forms with respect to the direction of flow obtains a maximum value.

9. The method of manufacturing a magnetic particle according to claim 8, wherein said remaining solutions are added as orthogonal flows which intersect a straight-ahead flow formed by said high-pressure jet stream almost at right angles.

10. The method of manufacturing a magnetic particle according to claim 8, wherein said high-pressure jet stream is spouted in thin film form into said mixing field.

11. The method of manufacturing a magnetic particle according to claim 1, wherein at least two kinds of metallic atoms constituting the alloy particle capable of forming said CuAu type or $Cu_3Au$ type hard magnetic ordered alloy phase are selected from the Groups 6, 8, 9 and 10 of the long periodic table and at least further one kind of metallic atom is selected from the Groups 11, 12, 13, 14 and 15, the content of said one kind of metal atom being 1 to 30 atom % of the whole alloy.

12. The method of manufacturing a magnetic particle according to claim 1, wherein the mixing and reaction temperature in said alloy particle preparation step is controlled to the range of $-5°$ C. to $30°$ C.

13. The method of manufacturing a magnetic particle according to claim 1, wherein in the magnetic particle formation step of forming a CuAu type or $Cu_3Au$ type magnetic particle from the alloy particle prepared in said alloy particle preparation step, annealing treatment is performed after the application of an alloy-particle-containing solution, which contains the alloy particle prepared in said alloy particle preparation step, to a backing.

14. The method of manufacturing a magnetic particle according to claim 13, wherein the annealing treatment temperature in said annealing treatment is controlled in the range of $100°$ C. to $500°$ C.

* * * * *